US012674568B2

(12) United States Patent
Hierzer

(10) Patent No.: US 12,674,568 B2
(45) Date of Patent: Jul. 7, 2026

(54) CONNECTOR AND FEED-IN COMPONENT AND LIGHTING ARRANGEMENT WITH SUCH A CONNECTOR AND/OR FEED-IN COMPONENT

(71) Applicant: H4X e.U., Graz (AT)

(72) Inventor: Andreas Hierzer, Graz (AT)

(73) Assignee: H4X E.U., Graz (AT)

( * ) Notice: Subject to any disclaimer, the term of this patent is extended or adjusted under 35 U.S.C. 154(b) by 0 days.

(21) Appl. No.: 18/967,104

(22) Filed: Dec. 3, 2024

(65) Prior Publication Data

US 2025/0180198 A1 Jun. 5, 2025

(30) Foreign Application Priority Data

Dec. 4, 2023 (AT) .............................. A 50971/2023

(51) Int. Cl.
*F21S 8/06* (2006.01)
*F21V 21/35* (2006.01)
(Continued)

(52) U.S. Cl.
CPC .............. *F21V 23/06* (2013.01); *F21S 8/066* (2013.01); *F21V 21/35* (2013.01); (Continued)

(58) Field of Classification Search
CPC ........ F21V 23/06; F21V 21/35; F21V 21/025; F21S 8/066; F21S 2/005; F21S 4/20
See application file for complete search history.

(56) References Cited

U.S. PATENT DOCUMENTS

2017/0292661 A1* 10/2017 Moioli .................... F21S 2/005
2018/0006412 A1* 1/2018 Leaverton ............... A47F 11/10
(Continued)

FOREIGN PATENT DOCUMENTS

CN 212323362 U 1/2021
DE 102009054510 B4 7/2016
(Continued)

OTHER PUBLICATIONS

English translation of WO-2023012507-A1 Stephan (Year: 2023).*
(Continued)

*Primary Examiner* — Evan P Dzierzynski
(74) *Attorney, Agent, or Firm* — Millen, White, Zelano & Branigan P.C.; William F. Nixon

(57) ABSTRACT

A connector with a connector portion can be inserted into rail portions of a lighting system in each case. The rail portions are each provided with a conductor arrangement for supplying lighting devices with at least electrical operating current. The connector is configured to electrically couple the conductor arrangements of at least two of the rail portions to one another. The connector comprises a printed circuit board with conductive traces, and the connector comprises contact elements, each of which being firmly connected to the printed circuit board and configured to contact a conductor of one of the conductor arrangements in each case. In this case, the connector enables an electrical coupling of the corresponding conductors of the conductor arrangements by means of an electrical coupling of associated contact elements using at least one of the conductive traces.

20 Claims, 14 Drawing Sheets

(51) Int. Cl.

| | |
|---|---|
| ***F21V 23/06*** | (2006.01) |
| ***H01R 13/24*** | (2006.01) |
| ***H01R 13/424*** | (2006.01) |
| ***H01R 13/512*** | (2006.01) |
| ***H01R 25/16*** | (2006.01) |

(52) U.S. Cl.

CPC ....... *H01R 13/2435* (2013.01); *H01R 13/424* (2013.01); *H01R 13/512* (2013.01); *H01R 25/168* (2013.01)

(56) References Cited

U.S. PATENT DOCUMENTS

| | | | | |
|---|---|---|---|---|
| 2019/0383473 | A1* | 12/2019 | Agro | F21S 2/00 |
| 2022/0307679 | A1* | 9/2022 | Hierzer | F21V 23/0435 |
| 2024/0347991 | A1* | 10/2024 | Stepan | F21V 15/013 |

FOREIGN PATENT DOCUMENTS

| | | | | |
|---|---|---|---|---|
| EP | 3876365 | B1 | 6/2023 | |
| WO | WO-2023012507 | A1 * | 2/2003 | H01R 33/92 |

OTHER PUBLICATIONS

European Search Report for EP24212235 dated Apr. 7, 2025.
Office Action for Austrian Application No. A 50971/2023 dated Sep. 6, 2024.

* cited by examiner

CONNECTOR AND FEED-IN COMPONENT AND LIGHTING ARRANGEMENT WITH SUCH A CONNECTOR AND/OR FEED-IN COMPONENT

BACKGROUND OF INVENTION

The invention relates to the field of lighting systems formed with rail portions. Here, the invention relates to a connector and a feed-in component for use in a lighting system. Furthermore, the invention relates to a lighting arrangement comprising at least one such connector and/or at least one such feed-in component.

TECHNICAL BACKGROUND

Lighting systems with channels or rails and with lighting units that can be coupled to the channels or rails are already known as such. The channels or rails are often equipped with busbars with electrical conductors that enable the lighting units to be supplied with power. Such lighting systems can be used in a variety of ways and enable flexible, attractive lighting.

It has also already been described how busbar portions of successive portions of the channel or rail can be electrically coupled using a connector.

A lighting system with a channel for accommodating at least one lighting unit and with at least one connector that can be inserted into the channel and by means of which busbar portions can be electrically coupled to one another is described in DE 10 2016 225 199 A1. The connector has movable catches to engage behind longitudinal ribs on the inside of the channel. DE 10 2016 225 199 A1 also describes a current feed unit for feeding electrical current into the busbar of the duct.

In conventional lighting systems, internal wiring using individual cables or cores is often used for connector components to electrically connect two rail portions. This type of construction therefore involves a large number of individual conductive connectors, the design of which requires a comparatively high level of effort to ensure the desired reliability. In addition, a relatively large amount of installation space is required within a housing for conventional connector components with internal cabling. On the one hand, sufficient space must be provided in the housing in order to be able to carry out the cabling, and on the other hand, conventional connectors also require a relatively large minimum height, for example, in order to ensure that their tolerance range can be maintained when bending the wires or cables.

Although known lighting systems are therefore already very attractive, flexible and reliable, it would nevertheless be desirable to have an alternative design that enables a high level of reliability when connecting rail portions and/or feeding electrical energy and/or signals into them relatively easily and preferably at the same or lower cost. It would also be desirable to have a more compact design that would allow rail portions to be connected and/or fed in in this way.

SUMMARY OF THE INVENTION

Against this background, it is a object of the invention to disclose an improved way of connecting two rail portions of a lighting system and/or of feeding electrical energy and/or signals into such a rail portion.

According to the invention, this object is achieved by a connector having the features of claim 1 and/or by a feed-in component having the features of claim 18 and/or by a lighting arrangement having the features of claim 19 and/or by a lighting arrangement having the features of claim 20.

Accordingly, a connector is proposed which can be inserted into rail portions of a lighting system with a connector portion thereof in each case. The rail portions are each provided with a conductor arrangement for supplying at least electrical operating current to lighting devices which can be coupled to the rail portions. The connector is configured to electrically couple the conductor arrangements of at least two of the rail portions to one another. In this case, the connector has a printed circuit board with conductive traces, and the connector has contact elements which are each firmly connected to the printed circuit board and are each designed to contact a conductor of one of the conductor arrangements of the at least two rail portions. According to the invention, the connector enables an electrical coupling of corresponding conductors of the conductor arrangements of the at least two rail portions by means of an electrical coupling of associated contact elements using at least one of the conductive traces.

Furthermore, according to the invention, a feed-in component which can be inserted into at least one rail portion of a lighting system is proposed. In this case, the rail portion is provided with a conductor arrangement for supplying at least electrical operating current to lighting devices which can be coupled to the rail portion. The feed-in component is designed to supply the conductor arrangement of the rail portion with at least the electrical operating current. The feed-in component has a printed circuit board with conductive traces. Furthermore, the feed-in component has contact elements that are each firmly connected to the printed circuit board and are each designed to contact a conductor of the conductor arrangement of the rail portion. In accordance with the invention, the feed-in component enables conductors of the conductor arrangement of the rail portion to be electrically coupled to corresponding conductors of a feed line using at least one of the conductive traces.

According to the invention, a lighting arrangement with at least two rail portions, at least one connector according to the invention and at least one lighting device is also provided. The rail portions are each provided with a conductor arrangement. The lighting device is coupled to one of the rail portions and can be supplied with at least electrical operating current through its conductor arrangement. The connector is inserted into the rail portions with a connector portion thereof and couples the conductor arrangements of the rail portions electrically to one another.

Furthermore, according to the invention, a lighting arrangement with at least one rail portion, at least one feed-in component according to the invention and at least one lighting device is provided. The rail portion is provided with a conductor arrangement, and the lighting device is coupled to the rail portion and can be supplied with at least electrical operating current by its conductor arrangement. In this case, the feed-in component is inserted into the rail portion and supplies the conductor arrangement of the rail portion with at least the electrical operating current.

One idea underlying the invention is to make the connector internally wireless, in that electrical current, or for example electrical current and a control signal, can be passed from one rail portion to the next at the connection point via the conductive trace(s) of a circuit board or printed circuit board. In this way, it is possible to avoid arranging, attaching and contacting cables or wires, for example in a flexible design, within the connector. The circuit board or printed circuit board as such may be of a type selected from a plurality of types of circuit boards known as such to the person skilled in the art.

Another idea underlying the invention is to provide a feed-in option in an analogous manner which largely avoids internal wiring in a feed-in component.

The use of the printed circuit board and its conductive trace(s) for the electrical coupling of the rail portions, or for the feed, makes it possible to further increase the reliability of the lighting system. Loose cables or wires are avoided. The printed circuit board, with the fixed connection of the contact elements to it, can be manufactured cost-effectively, with high accuracy and automatically. In addition, the connector and the feed-in component can each be assembled in a simple manner.

The printed circuit board, for example a PCB (printed circuit board), can also be installed in a space-saving manner. The space required to accommodate cables or individually insulated wires, taking into account their tolerance range, for example their minimum bending radii, is avoided. In this way, the connector can be advantageously compact and space-saving. A compact and space-saving feed-in component is also made possible in this way.

Advantageous embodiments and further developments of the invention are apparent from further sub-claims and from the description with reference to the figures.

In one embodiment, the contact elements are elastically resilient. This enables reliable contacting. In particular, it can thus be ensured that the contact elements each contact the associated conductor with a defined and sufficient force, whereby the connector can be conveniently handled and inserted into the rail portions without applying excessive force.

According to one embodiment, the connector has a housing part. In the absence of an external force acting on the contact element, the contact elements are resiliently preloaded against an area of the housing part. In this way, the contact elements can each assume a clearly defined position without a sufficient externally applied force, for example in a state in which they are not inserted into the rail portions. In particular, this prevents the contact elements from protruding excessively from the connector. This advantageously facilitates insertion and prevents damage to areas of the rail portions that are visible to the observer, for example due to scratching.

In one further development in particular, the printed circuit board is accommodated in an inner area of the housing part. In this way, the printed circuit board can be well protected and secured, and unwanted access to the printed circuit board and its conductive traces can be prevented. In particular, by using the printed circuit board and its conductive traces instead of a space-consuming design with cables or wires for internal electrical coupling, a housing of the connector formed with the housing part can be built in a compact and space-saving manner.

According to a further development, the contact elements are each designed with a bearing portion which, in the absence of the external force acting on the contact element, is resiliently preloaded on the inside of the housing part. In this way, the defined position of the contact elements, in which no or no sufficient external, in particular mechanical, force acts on them, is ensured reliably and in a manner protected by the housing part.

In one embodiment, the housing part has side walls that are each provided with recesses, whereby the contact elements and the recesses are arranged and designed in such a way that a contact portion of one of the contact elements intended for contacting a conductor protrudes outwards through the recesses. This ensures good protection of current-carrying and/or signal-carrying electrically conductive components inside the housing part and at the same time enables the conductors of the conductor arrangements of the rail portions to be contacted.

According to a further development, in the absence of the external force acting on the contact element, the contact elements are resiliently preloaded in an edge area of the recess assigned to the contact element on the inside of the side wall. This makes it easy to achieve the defined position of the contact elements in the absence of a sufficient external force.

According to one embodiment, the side walls adjoin a base of the housing part, with the printed circuit board being arranged essentially parallel to the base. In particular, the side walls together with the base and with further walls of the housing part form a box-like shape. In this way, a connector can be created that can be inserted into the rail portions in a space-saving manner, for example in channel-like rail portions. In addition, with such an arrangement of the printed circuit board, for example, contacting of conductors arranged on the rail portions to the side of the inserted connector can be achieved in a simple, space-saving manner. For example, a printed circuit board equipped on one side, in particular with the contact elements, can be used for such contacting with the printed circuit board aligned essentially parallel to the floor.

In one embodiment, the side walls are also designed with latching means for holding the connector in the rail portions in a latching manner. The connector can thus be easily mounted in the rail portions and removed again as required. The latching means act to mechanically hold the connector in a way that is independent of the force applied by the contact elements. The contact elements can thus be specifically adapted to the contacting requirements, whereas the latching means are designed for mechanical retention.

For example, the latching means can each be formed with an elastically retracting portion of the side wall. This enables the formation of latching means in a simple, cost-effective manner.

According to one embodiment, the connector is formed with an I-like basic shape, whereby the connector portions are formed as free, aligned end regions of the connector. A connector of this type enables the coupling of two rail portions that are aligned parallel to each other and aligned with each other, for example to create a long, straight rail.

In another embodiment, the connector is designed with an X-like basic shape or with an L-like basic shape or with a T-like basic shape, whereby the connector portions are designed as arm-like extending areas of the connector. Such connectors enable arrangements of rail portions that include crossings, corners and/or branches. Thus, rail systems for lighting purposes can be realized with a variety of different arrangements of the rail portions.

In a further embodiment, the connector can be designed with a Y-like basic shape or a star-like basic shape, whereby the connector portions are designed as arm-like extending areas of the connector. When the connector is formed with a star-like basic shape, a number of the connector portions is in particular greater than four, and may for example be five or six. Even more appealing and useful arrangements of the rail portions can be implemented in this way.

In one embodiment, the connector is formed with an X-like basic shape, wherein the connector portions are formed as arm-like extending regions of the connector. According to this embodiment, it is provided that the connector has two printed circuit boards, each with an essentially L-shaped basic shape, a number of the contact elements are arranged on one of the two printed circuit boards, two of the connector portions are assigned to one of the two printed circuit boards, and the two printed circuit boards are arranged in such a way that peak regions of the essentially L-shaped basic shape of each are adjacent to each other. This makes it possible to easily equip the connector with an arrangement of two printed circuit boards adapted to the X-shaped basic shape. In particular, an electrical connection is not provided across a separation point between the two printed circuit boards formed with an essentially L-shaped basic shape, which is located in the area in which the peak regions of the basic shapes are adjacent to each other. This considerably simplifies the construction of the connector with an X-like basic shape and avoids the use of flexible cables or wires. At the same time, by using the conductive traces of the two printed circuit boards, the electrical coupling of the conductors of the conductor arrangements of two rail portions arranged in pairs at an angle to each other, in particular essentially at right angles to each other, is made possible in this way. In this way, a variety of lighting systems with a wide range of shapes can be designed.

In another embodiment, it may be provided that the connector is designed with an X-like basic shape, the connector portions are designed as arm-like extending areas of the connector and the printed circuit board of the connector has an essentially X-like basic shape. With such an embodiment, the conductive traces can be used to enable electrical coupling of the conductors of the conductor arrangements of all the rail portions into which the connector with the connector portions is inserted, or instead electrical coupling of the conductors of the conductor arrangements of two rail portions arranged at an angle to each other in pairs, in particular at substantially right angles to each other. In yet another embodiment, it may be provided that the connector is designed with a star-like basic shape, the connector portions are designed as arm-like extending regions of the connector and the printed circuit board of the connector has an essentially star-like basic shape. Even in such an embodiment, the conductor arrangements of all or some of the rail portions, for example in pairs of two rail portions arranged at an angle of less than 90 degrees to each other, can be electrically coupled by means of the conductive traces. In one embodiment, the connector portions are each elongated. Space-saving, slim connector portions are possible in this way, with the aid of which a plurality of conductors of the conductor arrangement of each of the rail portions can be contacted.

In a further embodiment, the connector portions have an essentially square cross-sectional shape, in particular an elongated cuboidal shape. Such a cross-sectional shape is well suited for use in channel-like rail portions, for example.

The connector portions can, for example, each extend essentially in a straight line along a longitudinal direction. In this case, the connector portions can be inserted into rail portions that are straight overall or at least in end regions thereof.

In alternative embodiments, the connector portions can instead each have a curved or bent shape along their longitudinal extension and, for example, each follow a circular arc section. In embodiments with one or more curved or bent connector portions, the area of the printed circuit board assigned to the connector portion and the rail portion into which the connector portion can be inserted are also curved or bent.

Combinations of straight and curved or bent connector portions of the connector are also possible in further embodiments.

In one embodiment, the contact elements of the connector comprise contact elements that are each designed for contacting conductors to provide a DC operating voltage for the lighting devices, in particular a DC operating voltage of essentially 48 volts.

In a further embodiment, the conductor arrangement with which the rail portions are each provided is also designed to provide a control signal for controlling one or more of the lighting devices that can be coupled to the rail portions. This enables flexible and versatile operation of the lighting devices.

In a further development, the contact elements of the connector comprise contact elements that are each designed to contact conductors to provide the control signal, in particular a DALI signal. In this way, a control signal provided in one rail portion can also be provided in one or more other rail portions.

According to a further development, at least four of the contact elements are arranged in each of the connector portions, with at least two of the at least four contact elements being provided for contacting the conductors to provide the DC operating voltage and at least two contact elements being provided for contacting the conductors to provide the control signal.

According to one embodiment, the contact elements are each soldered to the printed circuit board. The attachment and contacting of the contact elements on the printed circuit board by means of a soldering process can be carried out in a simple and automatable manner. Such a soldered connection is also reliable.

In one embodiment, the contact elements are each designed with a fastening portion for the fixed connector to the printed circuit board and a cranked, resilient intermediate portion following the fastening portion. In this way, it is possible to make the contact elements resilient and at the same time to contact conductors of the conductor arrangements that are arranged at different heights in relation to the printed circuit board by means of the offset of the intermediate portion through contact elements arranged on the same printed circuit board.

In a further development, the printed circuit board is designed with elongated circuit board portions, each of which is assigned to one of the connector portions and extends in the respective assigned connector portion. Furthermore, in this embodiment, the circuit board portion has a cutout at one edge of the circuit board portion to accommodate an associated one of the contact elements. In this way, the space within the connector portion can be well utilized, and the recess also contributes to a space-saving design of the connector in a transverse direction thereof.

In one embodiment, a direction along which the contact elements can spring back when the connector is inserted into the rail portions runs essentially transverse to a longitudinal extension direction of the connector portion in which the contact element is arranged and essentially parallel to a main extension surface of the printed circuit board. Such a connector may, for example, be well suited to contacting conductors arranged laterally in the rail portions by means of the contact elements.

The lighting arrangement according to the invention, which comprises the connector according to the invention, may further comprise, in one embodiment, the feed-in component according to the invention for feeding the conductor arrangement of one of the rail portions.

The above-described embodiments and further embodiments of the invention are applicable in an analogous manner to the connector and to the feed-in component as well as to the lighting arrangements with the connector and/or the feed-in component. Here, the feed-in component is preferably provided for insertion into only one of the rail portions, is designed in particular with an I-like basic shape and is further preferably designed, in particular with regard to the housing parts, the printed circuit board and the arrangement of the contact elements, like one of the connector portions described above. In a preferred embodiment, the feed-in component has four contact elements, two of which are provided for contacting the conductors to provide the DC operating voltage and two of which are provided for contacting the conductors to provide the control signal.

However, it is also conceivable that the connector proposed according to the invention, which can be used in two or more rail portions, can be designed in further exemplary variants with an additional feed-in function that corresponds to the feed-in function of the feed-in component.

Embodiments and developments of the invention can, where appropriate, be combined with one another as desired. Further possible embodiments, developments and implementations of the invention also comprise non-explicitly specified combinations of features of the invention which have been described above or below with respect to the exemplary embodiments. In particular, the person skilled in the art will also add individual aspects as improvements or additions to the respective basic form of the present invention.

BRIEF DESCRIPTION OF THE DRAWINGS

The invention will be explained in more detail below on the basis of the exemplary embodiments specified in the schematic figures. In the drawings.

The enclosed figures are intended to provide a better understanding of the embodiments of the present invention. They illustrate embodiments and, together with the description, serve to explain principles and concepts of the invention. Other embodiments and many of the cited advantages emerge in light of the drawings. The elements of the drawings are not necessarily shown to scale in relation to one another.

In the figures, identical, functionally identical and identically acting elements, features and components are each provided with the same reference symbols unless stated otherwise.

DESCRIPTION OF EXEMPLARY EMBODIMENTS

Figure 22:
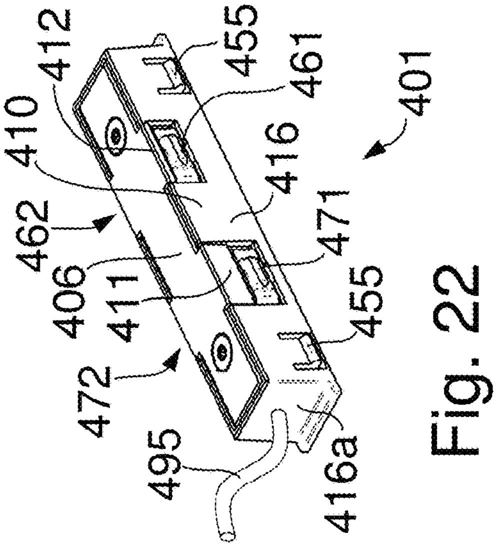
FIG. 22 a feed-in component according to an exemplary embodiment.
Figure 18:
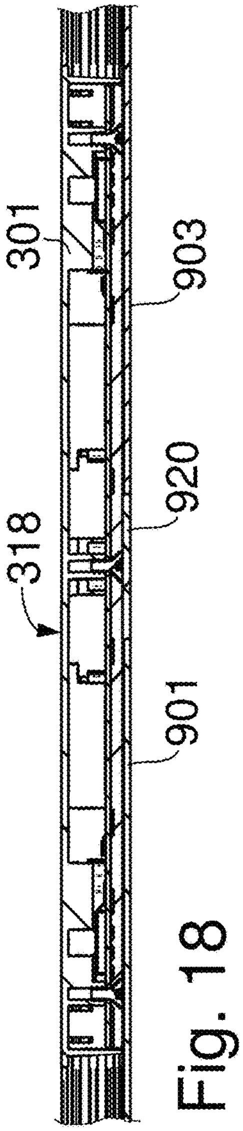
FIG. 18 a sectional view A'-A' of the lighting arrangement of FIG. 17.
Figure 21:
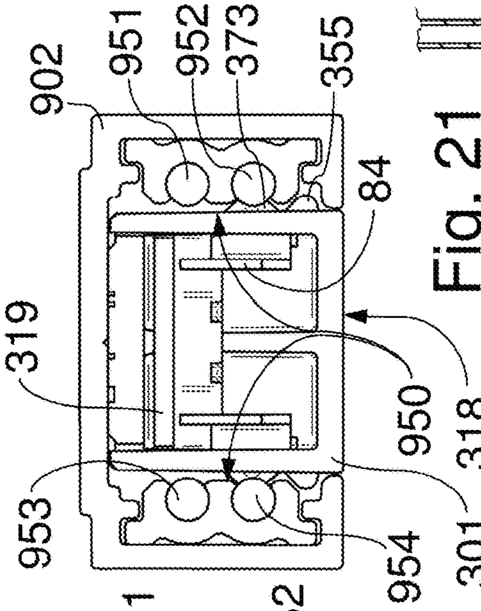
FIG. 21 a sectional view D'-D' of the lighting arrangement of FIG. 17.

FIGS. 1-15 show connectors 1, 101, 201, 301 according to embodiments of the invention. FIG. 22 illustrates a feed-in component 401 according to an exemplary embodiment of the invention. The connectors 1, 101, 201, 301 and the feed-in component 401 can be used in a wide variety of selections and combinations of these together with profile-type rail portions, lighting devices and other components of a rail lighting system in a modular manner for the construction of lighting arrangements. FIGS. 16-21 show sections of lighting arrangements 1000 and 2000 according to exemplary embodiments for illustration, whereby many other designs of lighting arrangements using the connectors 1, 101, 201 and/or 301 and/or the feed-in component 401 are conceivable.

FIGS. 1-4 show the connector 1 in accordance with a first embodiment. The connector 1 has an I-shaped basic shape in the form of an elongated cuboid. Free, aligned end regions of the connector 1 form two elongated, cuboid connector portions 2 and 3. The connector 1 can be inserted in the area of a butt joint between two coaxially arranged and in particular rectilinear rail portions of a lighting system, whereby the connector portion 2 is inserted into one of the rail portions and the connector portion 3 into the other of the rail portions.

The connector 1 has a compact, space-saving housing, which is formed with a box-like housing part 6 and a cover-like housing part 10. The housing parts 6, 10 can be made of a plastic material, for example by injection molding. After assembly of the connector 1, the cover-like housing part 10 closes a longitudinal side of the housing part 6 shown in FIGS. 1 and 2.

The housing part 6 has substantially flat side walls 16 along longitudinal sides thereof and is also provided with substantially flat end walls 16*a*. The side walls 16 and the walls 16*a* are connected to a substantially planar base 18 of the housing part 6 and, in particular, are formed integrally with the base 18. In this case, the side walls 16 and the walls 16*a* adjoin the base 18 along a peripheral edge region of the base 18, form a box-like shape with the base 18 and enclose an inner region of the housing part 6.

The side walls 16 each have a plurality of rectangular recesses 46, 47 extending from an edge of the side wall 16 facing away from the base 18 into the side wall 16, through which the inner region of the housing part 6 is accessible. Each side wall 16 has two recesses 46 and two recesses 47, the recesses 47 being arranged between the recesses 46. The recesses 46 are deeper than the recesses 47.

The side walls 16 are also provided with latching recesses 43, which serve to connect the housing parts 6 and 10. Furthermore, the side walls 16 each have a plurality of latching means 55, four in FIGS. 1-4 by way of example, which are configured to hold the connector 1 in the rail portions in a latching manner. The latching means 55 are each formed with an elastically movable portion of the side wall 16 and a latching lug arranged on an outer side.

The cover-like housing part 10 has latching elements 13 on both longitudinal sides thereof in a central region, which are designed to latch with one of the latching recesses 43 in each case for connecting the housing parts 6 and 10. Furthermore, the cover-like housing part 10 has a through opening 14 in each of its opposite end regions, through each of which a screw 15 can be inserted to connect the housing parts 6 and 10. The screw 15 can be screwed into an associated screw dome 49 formed on the housing part 6.

The housing part 10 also has several extensions 11 and 12 on its longitudinal sides, the positions of which correspond to those of the recesses 46 and 47. After assembly of the connector 1, the extensions 11 extend wall-like into a part of the recess 46, whereas the extensions 12 are smaller than the extensions 11 and close off the less deep recesses 47 on their open sides facing away from the base 18.

In the inner region of the housing part 6, parallel to the base 18, an elongated printed circuit board 19, for example in the form of a PCB (printed circuit board), is accommodated. The printed circuit board 19 is formed as a continuous piece and has two elongated circuit board portions 25 and 26. The circuit board portion 25 is assigned to and extends in the connector portion 2, while the circuit board portion 26 is assigned to and extends in the connector portion 3. The printed circuit board portions 25, 26 are integrally connected in a central area of the printed circuit board 19, in which the printed circuit board 19 is symmetrically provided with cutouts 32 on both sides of the longitudinal edges thereof. The printed circuit board 19 has conductive traces 22, only some of which are sketched schematically and in sections in FIG. 1 for illustration.

In the first exemplary embodiment, eight elastically resilient contact elements 61-64, 71-74 are each soldered to the printed circuit board 19 and in this way are contacted on the printed circuit board 19 and firmly connected to the printed circuit board 19.

The contact elements 61-64, 71-74 are each formed in one piece, in particular from a metal material, and each have a fastening portion 82, a resilient intermediate portion 84 following the fastening portion 82, a contact portion 86 following the intermediate portion 84 and a bearing portion 88 following the contact portion 86.

Here, the fastening portion 82 is formed for the fixed connector of the contact element 61-64, 71-74 to the printed circuit board 19. The intermediate portion 84 is provided with an offset, whereby it enables positioning of the contact portion 86 in a direction transverse to the main plane of extension of the printed circuit board 19. The bearing portion 88 serves for a defined positioning of the contact portion 86 in a direction Q in which the contact element 61-64, 71-74 has its resilient mobility, in the absence of an external force F acting on the contact portion 86. The contact portion 86 is formed to protrude in sections in order to contact conductors of one of the rail portions in a manner described in more detail below.

The four contact elements 61, 62, 71 and 72 are arranged in the printed circuit board portion 25. The four contact elements 63, 64, 73 and 74 are arranged in the printed circuit board portion 26. Viewed perpendicularly to the main extension plane of the printed circuit board 19, the contact portions 86 of the contact elements 61, 62, 63 and 64 are arranged in a first plane spaced from the main extension plane and the contact portions 86 of the contact elements 71, 72, 73 and 74 are arranged in a second plane spaced from this main extension plane, the first and second planes being different. While the contact elements 71-74 with their contact portions 86 are arranged completely on a side of the printed circuit board 19 facing the base 18, the contact elements 61-64 with their contact portions 86 have a greater distance from the base 18 than the contact elements 71-74.

Each of the two printed circuit board portions 25, 26 has two symmetrically arranged cutouts 31 at the opposite longitudinal edges of the printed circuit board 19. In each case, one of the cutouts 31 is assigned to one of the contact elements 61-64. In this way, a portion of each of the contact elements 61-64, in particular parts of the intermediate portion 84, the contact portion 86 and the bearing portion 88, can protrude into the associated recess 31 and be received thereby with clearance for resilient deflection.

To assemble the connector 1, the contact elements 61-64 and 71-74 are each pressed inwards towards a longitudinal center plane of the printed circuit board 19 and thus in pairs towards each other. The printed circuit board 19 with the contact elements 61-64, 71-74 is then inserted into the inner area of the housing part 6, the housing part 10 is placed on top, the latching elements 13 and latching recesses 43 are latched and the screws 15 are screwed in. After assembly, the contact portions 86 of the contact elements 71-74 each protrude outwardly from the connector 1 through an associated one of the recesses 47, and the contact portions 86 of the contact elements 61-64 each protrude outwardly from the connector 1 through an associated one of the recesses 46.

Each of the contact elements 61-64, 71-74 can thus elastically spring back in a direction Q towards the inner region of the housing part 6 and towards a longitudinal center plane of the connector portion 2 or 3. The direction Q is only shown as an example in FIG. 3 for the contact elements 63 and 72 and runs analogously for the other contact elements 61, 62, 64, 71, 73, 74. The direction Q runs in each case essentially transversely to a longitudinal extension direction X of the connector portion 2 or 3 in which the contact element 61-64, 71-74 is arranged, and essentially parallel to the main extension surface of the printed circuit board 19.

Figure 1:
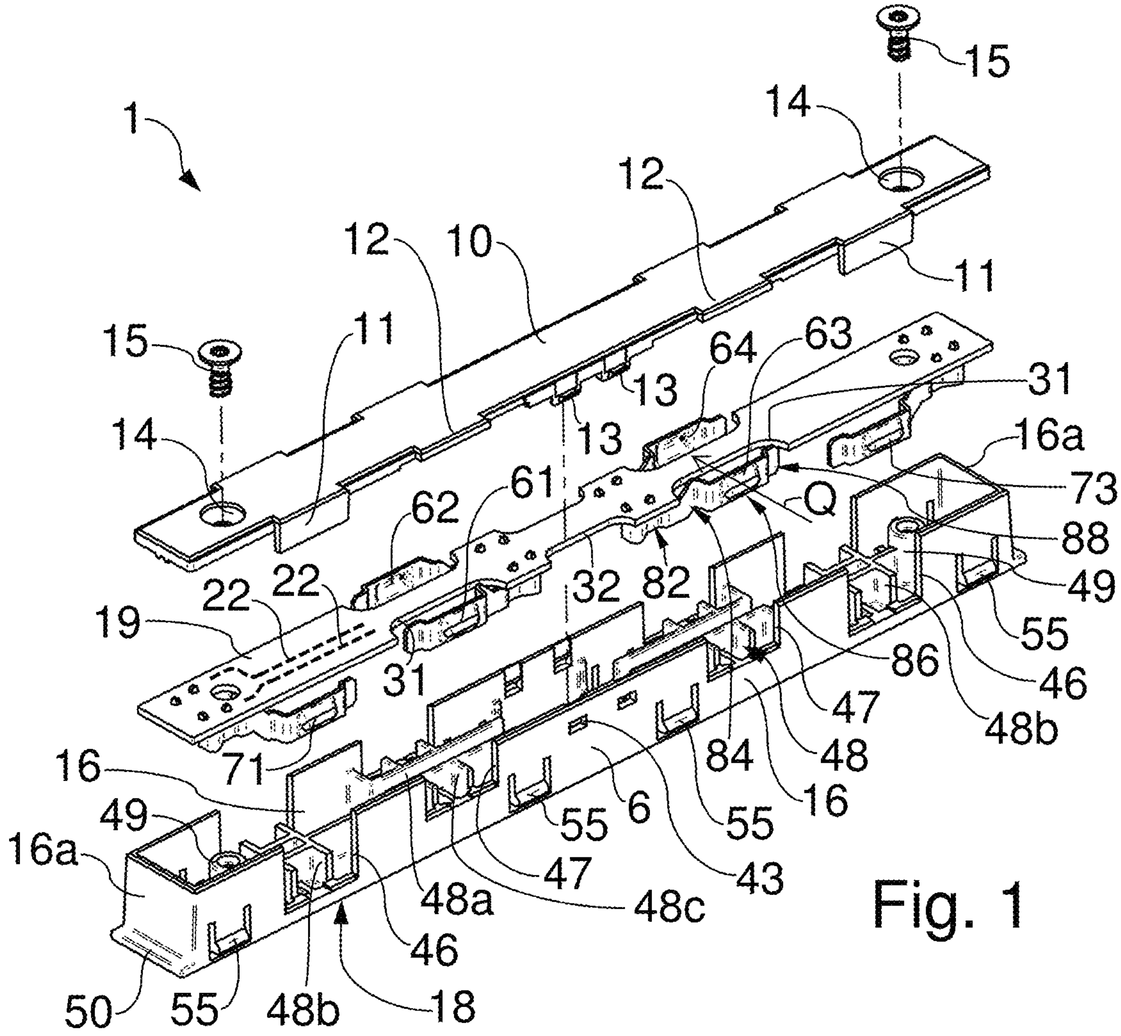
FIG. 1 a connector with an I-like basic shape according to a first exemplary embodiment, in an exploded perspective view, with a box-like housing part, a printed circuit board with contact elements arranged thereon and a cover-like housing part.
Figure 2:
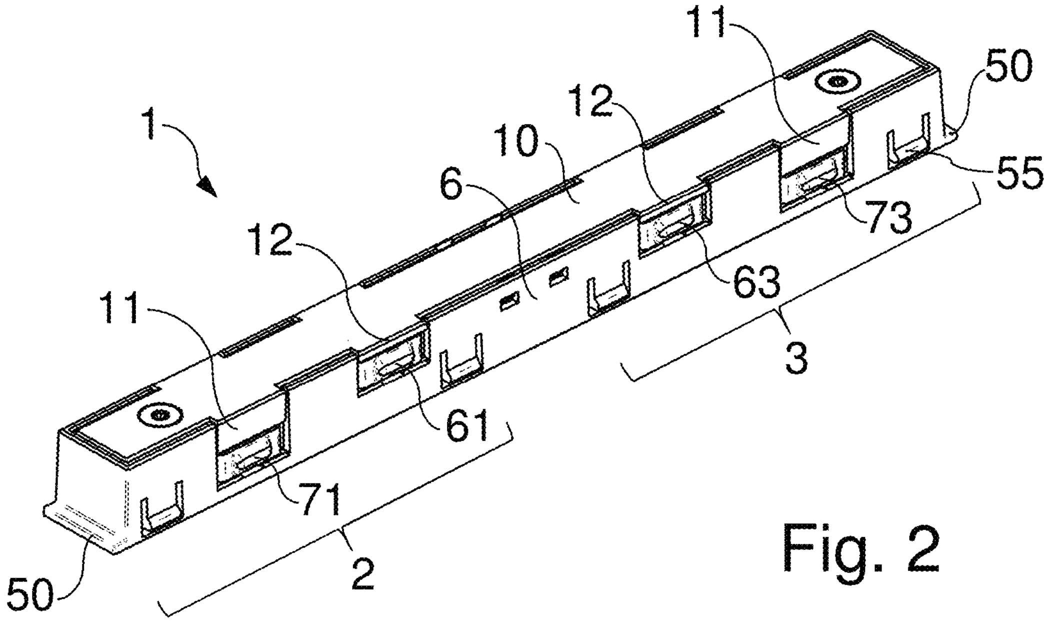
FIG. 2 the connector of FIG. 1, assembled, perspective view.
Figure 3:
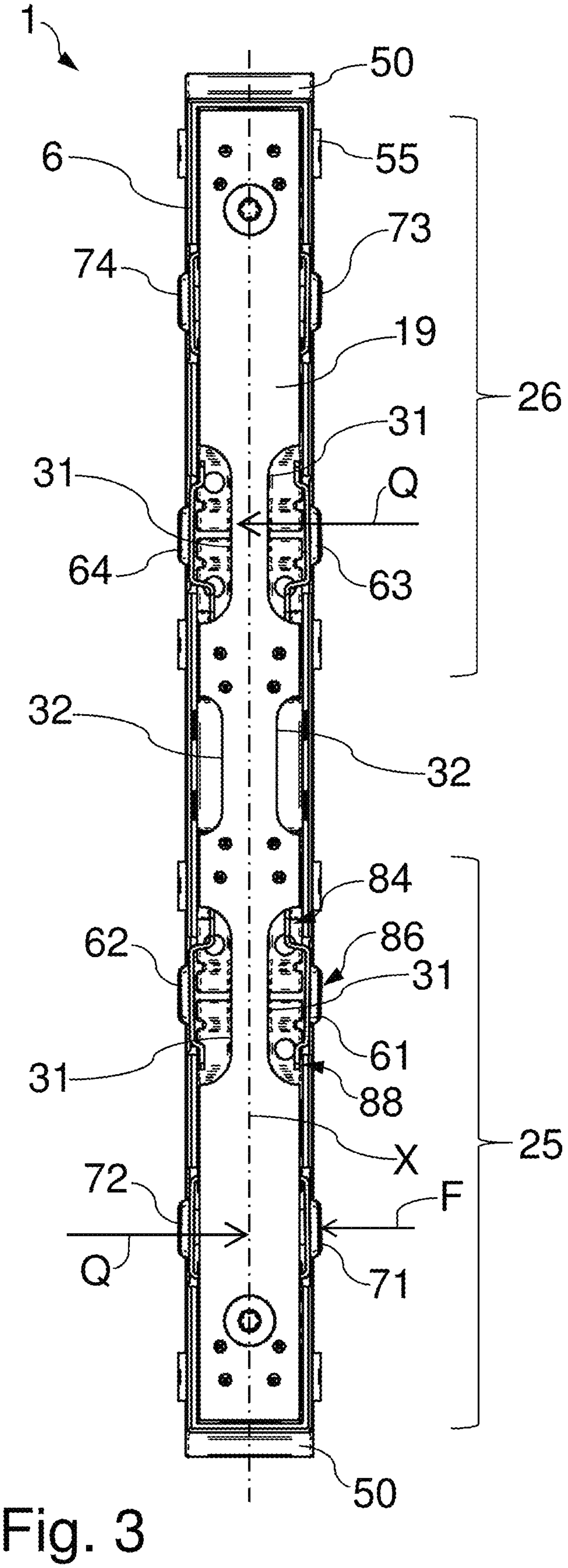
FIG. 3 a plan view of the connector of FIG. 1, with the cover-like housing part omitted and the printed circuit board visible.

In the absence of a sufficient external force F acting on the contact element 61-64, 71-74, see for example FIG. 3 for the contact element 71, the bearing portion 88 is resiliently prestressed in an edge region of the recesses 46 and 47 assigned to the contact element 61-64, 71-74 on the inside of the side wall 16 of the housing part 6. For this purpose, the bearing portion 88 is set back in the direction Q relative to the contact portion 86. In this way, in a state in which the connector 1 is not inserted into rail portions and no sufficient forces F are applied to the contact elements 61-64, 71-74 from the outside, each of the contact elements 61-64, 71-74 is in a defined position, in particular in the transverse direction of the connector 1. As a result, the contact portions 86 protrude outwards in a defined manner, neither too little nor too much.

The recesses 31 are dimensioned in such a way that the contact elements 61-64 can each spring into the housing part 6 in the desired manner.

A ribbed structure 48 is provided on the inside of the housing part 6. In the region of pairs of oppositely arranged contact elements 61, 62 and 63, 64, the rib structure 48 includes a longitudinal rib 48*a* in each case. In the assembled connector 1, the printed circuit board 19 rests on the screw bosses 49 and the longitudinal ribs 48*a*. Transverse ribs 48*b*, 48*c* of the ribbed structure 48, which are arranged in the area of the recesses 46 and 47 respectively, additionally stabilize the box-like housing part 6 and, as stops for the contact elements 61-64, 71-74, prevent them from being pressed excessively into the housing part 6.

Figure 4:
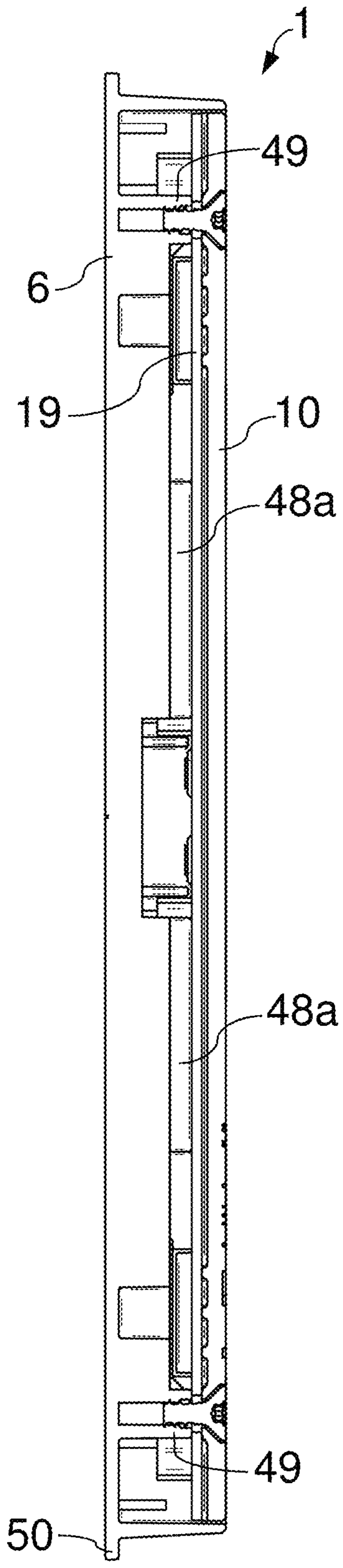
FIG. 4 the connector of FIG. 1 in a longitudinal section.

FIG. 4 shows a sectional view of the connector 1, in a central sectional plane along the longitudinal direction X and perpendicular to the base 18, the compact and space-saving accommodation of the printed circuit board or PCB 19, within the housing of the connector 1 formed with the housing parts 6 and 10. In addition, FIG. 4 illustrates this compact housing of the connector 1 formed with small dimensions, for example also in a direction perpendicular to the base 18.

A connector 101 with an X-like basic shape according to a second exemplary embodiment is shown in FIGS. 5-9. Elongated, cuboid connector portions 102-105 are formed as arm-like regions of the connector 101 extending away from an intersection region. The two connector portions 102 and 104 extend along a longitudinal extension direction X of the portions 102, 104, and the two connector portions 103 and 105 extend along a longitudinal extension direction Y of the portions 103, 105.

The directions X and Y are essentially at right angles to each other, although other crossing angles are conceivable as an alternative.

The connector 101 has a box-like housing part 106 and a cover-like housing part 110, each of which has an X-like basic shape in a plan view. Analogous to the first exemplary embodiment, the housing part 106 is formed with a base 118 and flat side walls 116 parallel to the direction X and flat side walls 117 parallel to the direction Y. The side walls 116, 117 adjoin the base 118 in one piece and are connected to each other in the intersection area in corner areas. In the region of free ends of the connector sections 102, 104, the side walls 116 are each connected by an end flat wall 116*a*. In the region of free ends of the connector sections 103, 105, the side walls 117 are each connected by a flat wall 117*a* at the end face. The walls 116, 117, 116*a*, 117*a* and the base 118 together form a box-like shape with an X-shaped base surface.

Analogous to the first exemplary embodiment, the side walls 116, 117 each have recesses 146, 147 and latching recesses 143. Furthermore, the side walls 116, 117 are each formed with latching means 155, 155*a* for latchingly holding the connector 101 in rail portions into which the connector 101 can be inserted with the connector portions 102-105. In this case, the latching means 155 are designed as in the first exemplary embodiment. The latching means 155*a* are also formed as elastically movable regions of the side wall 116 or 117, but differ from the latching means 155 in that the latching means 155*a* have a narrower section that bends elastically during engagement than the latching means 155, which connects the latching lug on the outside to the rest of the side wall 116 or 117. The 155*a* devices therefore require less force to engage than the 155 devices. In relation to the crossing area, the latching means 155 are arranged distally and the latching means 155*a* proximally. The different design of the latching means 155, 155*a* takes into account the closely adjacent arrangement of the latching means 155*a* with their directions of action at right angles to each other.

The housing part 106 is further formed with a ribbed structure 148 in the inner region thereof, which has longitudinal ribs 148*a* and transverse ribs 148*b*, 148*c* analogous to the first exemplary embodiment. In addition, the housing part 106 has screw domes 149 arranged in the inner region.

Analogous to the first exemplary embodiment, the housing part 110 is provided with through openings 114 for screws 15 as well as with extensions 111, 112 and latching elements 113.

Two printed circuit boards 119 and 120, each having a substantially L-shaped base, are received in the inner region of the housing part 106 and are each arranged substantially parallel to the base 118. The printed circuit boards 119, 120 rest on the longitudinal ribs 148 and the screw bosses 149.

The printed circuit boards 119, 120 are arranged such that peak regions 129 of the L-like basic shape of each printed circuit board 119, 120 are adjacent to each other in the crossing region. In the peak region 129, an outer edge of the printed circuit boards 119, 120 extends in each case obliquely, essentially at an angle of 45 degrees, to directions of extension of elongated printed circuit board portions 125, 126 and 127, 128, respectively, which form legs of the L-like basic shape. In this way, overlapping of the printed circuit boards 119, 120 in the crossing area is avoided. The obliquely extending areas of the outer edge are each provided with a semicircular recess 129*a* approximately in their center, the recesses 129*a* together forming a round opening for a central screw 15.

Figure 5:
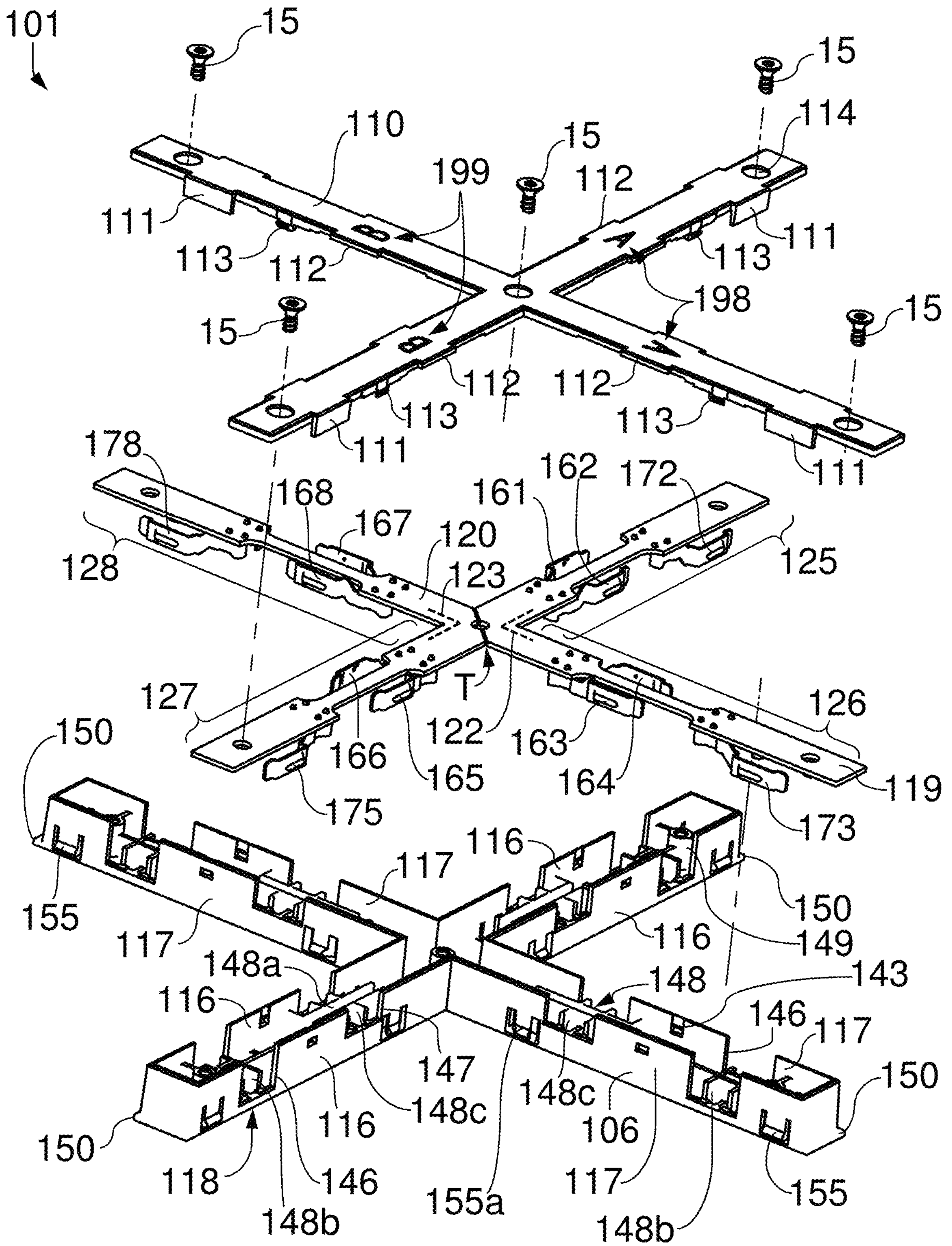
FIG. 5 a connector with an X-like basic shape according to a second exemplary embodiment, in an exploded perspective view, with a box-like housing part, two printed circuit boards with contact elements arranged on them and a cover-like housing part.
Figure 6:
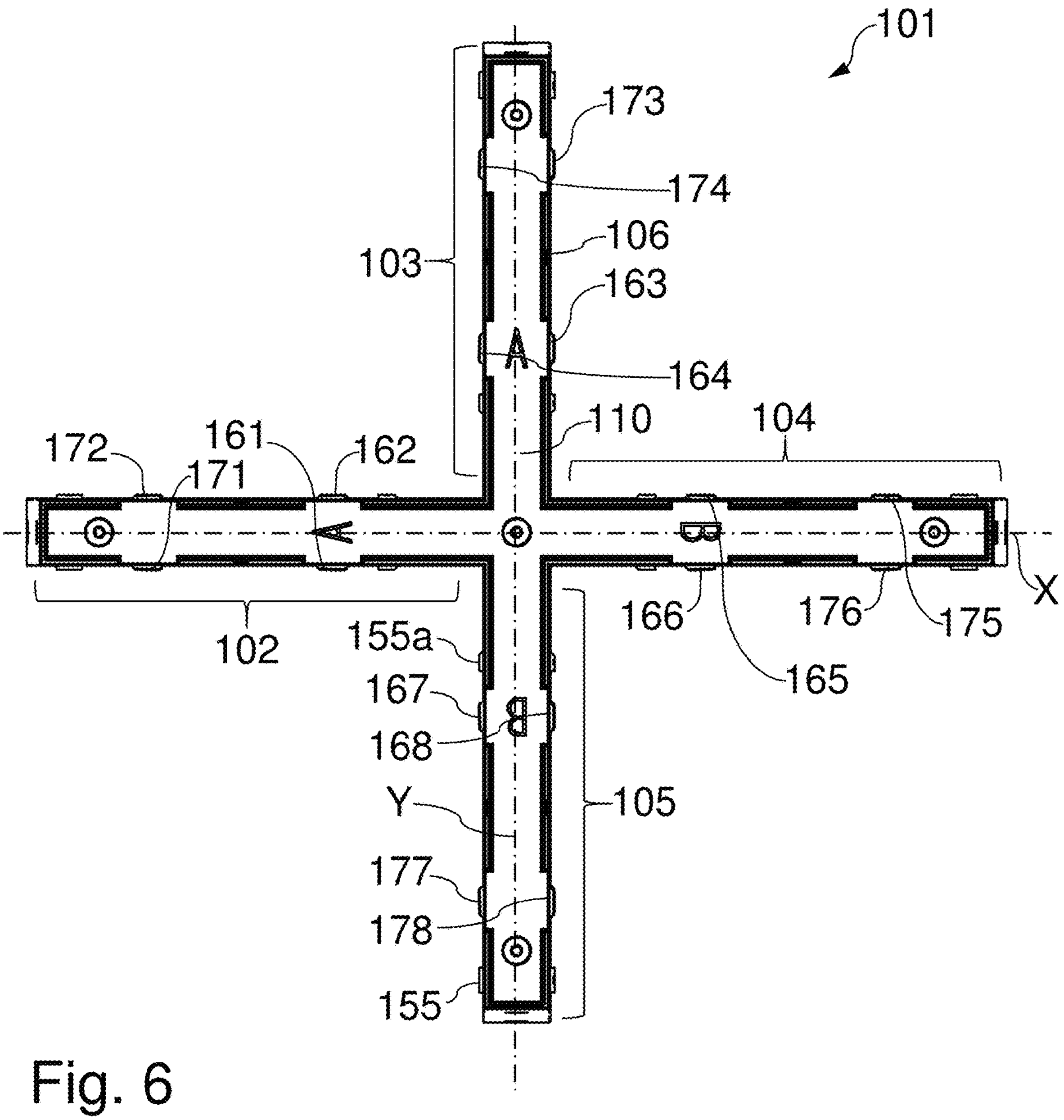
FIG. 6 the connector of FIG. 5, assembled, in a plan view.
Figure 7:
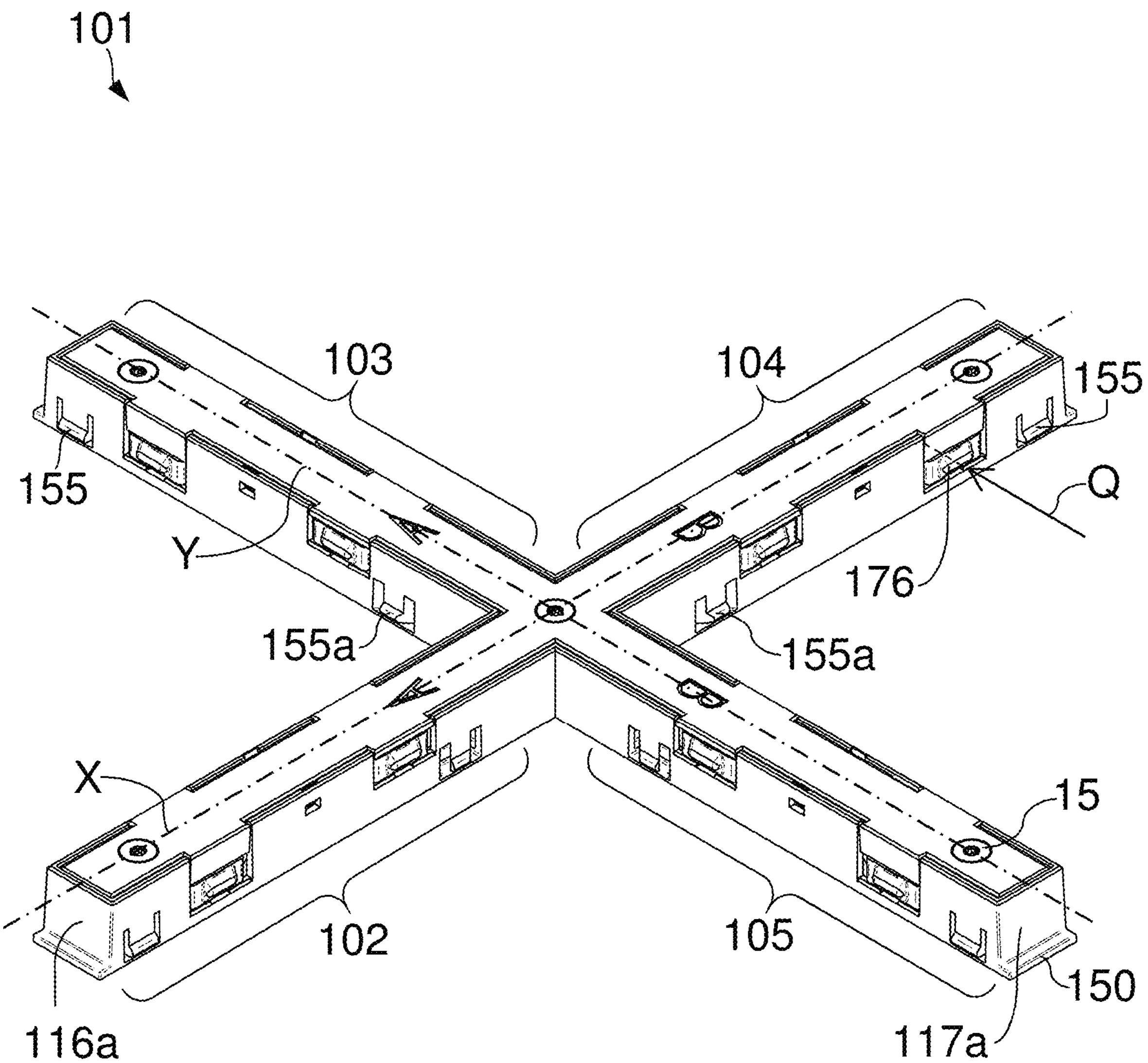
FIG. 7 perspective view of the connector of FIG. 5, assembled.
Figure 8:
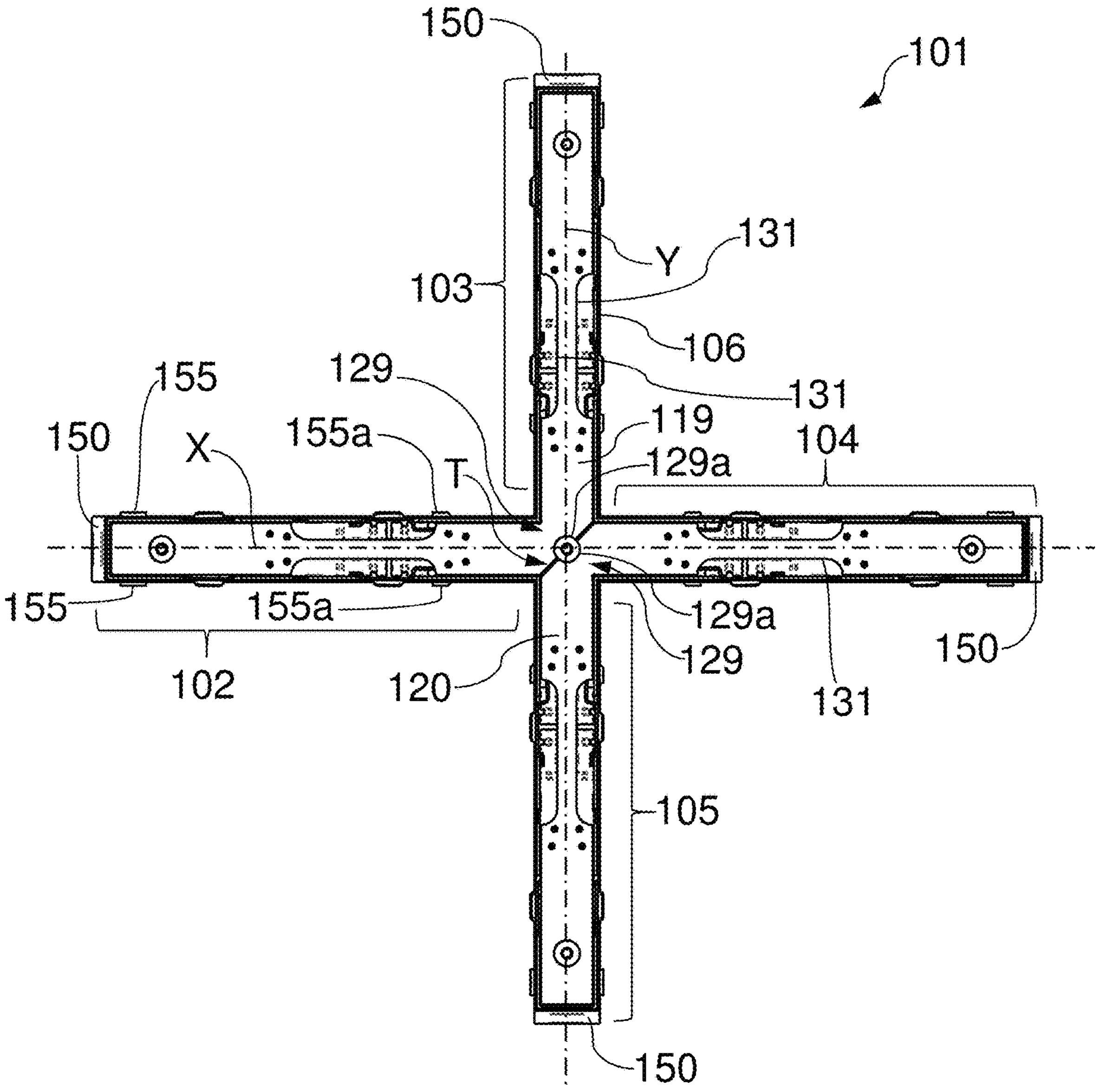
FIG. 8 the connector of FIG. 5 in the plan view of FIG. 6, with the cover-like housing part omitted and the printed circuit board visible.
Figure 9:
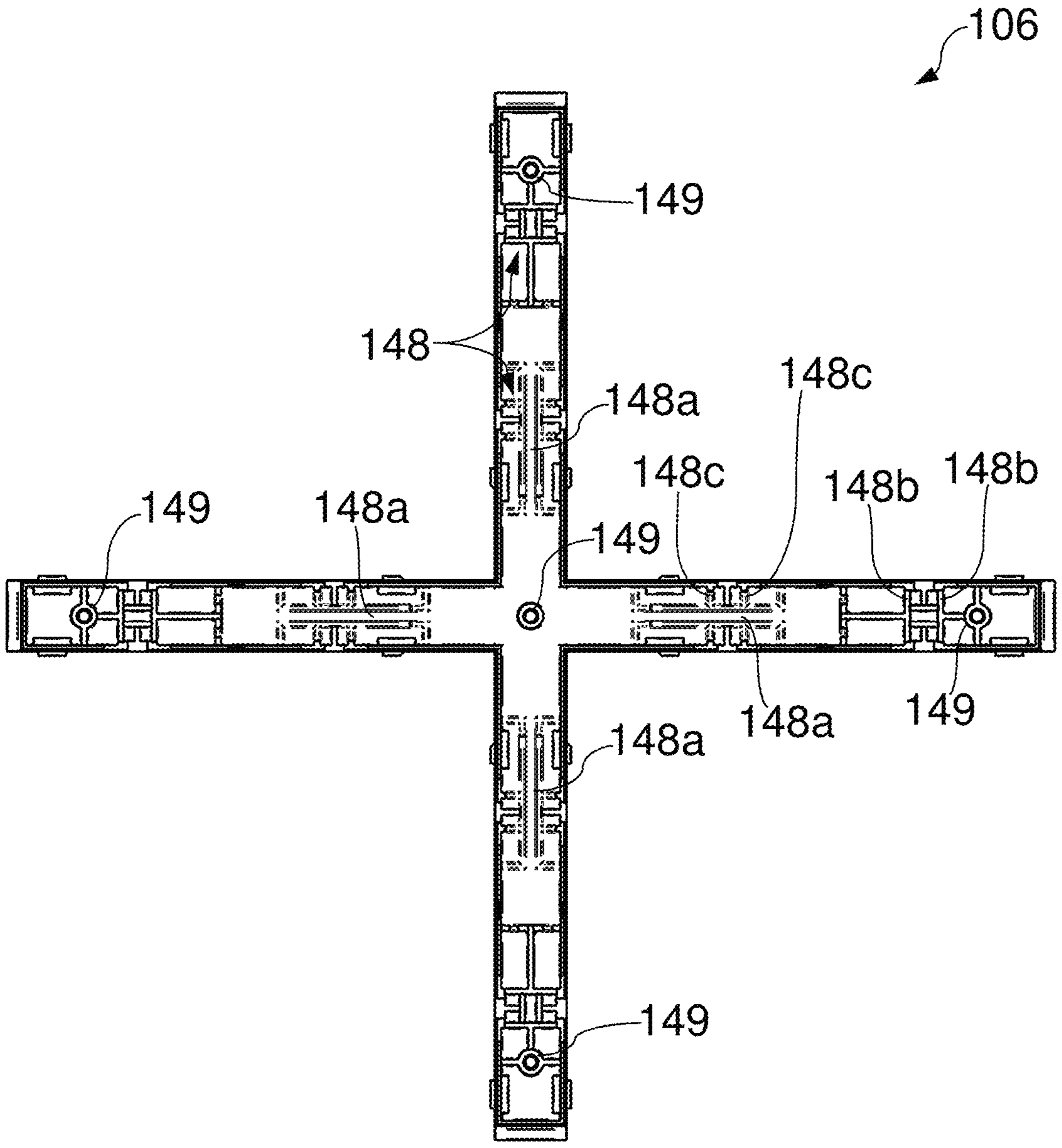
FIG. 9 the box-like housing part of the connector of FIG. 5 in a plan view showing an inner area of the box-like housing part.

Each of the printed circuit boards 119, 120 is provided with conductive traces 122 and 123, respectively, which are only schematically indicated in FIG. 5. No electrical connector is provided across a separation point T at which the two printed circuit boards 119, 120 adjoin each other in the peak regions 129.

The connector 101 has a total of sixteen elastically resilient contact elements 161-168, 171-178. Eight contact elements 161-164, 171-174 are arranged on the printed circuit board 119 and eight contact elements 165-168, 175-178 are arranged on the printed circuit board 120. The contact elements 161-164, 171-174 and 165-168, 175-178 are formed as in the first embodiment. Furthermore, the arrangement of the contact elements 161-164, 171-174 and 165-168, 175-178 on the printed circuit board 119 or 120 and their fixed connection to the printed circuit board 119 or 120 differs from the first exemplary embodiment only in that, in the exemplary embodiment of FIGS. 5-9, the contact elements 171-178 with their bearing portion 88 do not each point towards a center of the connector, but towards the free end of the associated one of the connector portions 102-105. The contact elements 161-168, 171-178 are resiliently biased against the inside of the housing part 106 in the manner described above for the first exemplary embodiment. To accommodate the contact elements 161-168 in certain areas, the printed circuit boards 119, 120 have cutouts 131 analogous to the first exemplary embodiment. The printed circuit boards 119, 120 may be formed in the same way and equipped with contact elements 161-164, 1 71-174 and 165-168, 175-178, respectively.

The printed circuit board portion 125 of the printed circuit board 119 is associated with and extends within the connector portion 102. The printed circuit board portion 126 of the printed circuit board 119 is associated with the connector portion 103 and extends therein. The printed circuit board portion 127 of the printed circuit board 120 is associated with the connector portion 104 and extends therein. The printed circuit board portion 128 of the printed circuit board 120 is associated with the connector portion 105 and extends therein.

The cover-like housing part 110 may preferably be provided with a marking 198, 199 which provides information to an assembler as to which of the connector portions 102-105 are each associated with the same printed circuit board 119 or 120.

In a variant of the second embodiment, which is not shown in the figures, a continuous printed circuit board having an X-like basic shape may be provided instead of the two separate printed circuit boards 119, 120. In such a variant, conductive traces may be provided on the printed circuit board that enable electrical coupling as described above for the embodiment with two separate printed circuit boards 119, 120, or, for example, conductive traces may be provided that enable corresponding ones of the contact elements 161-168, 171-178 of all connector portions 102-105 to be electrically coupled to each other.

Figure 10:
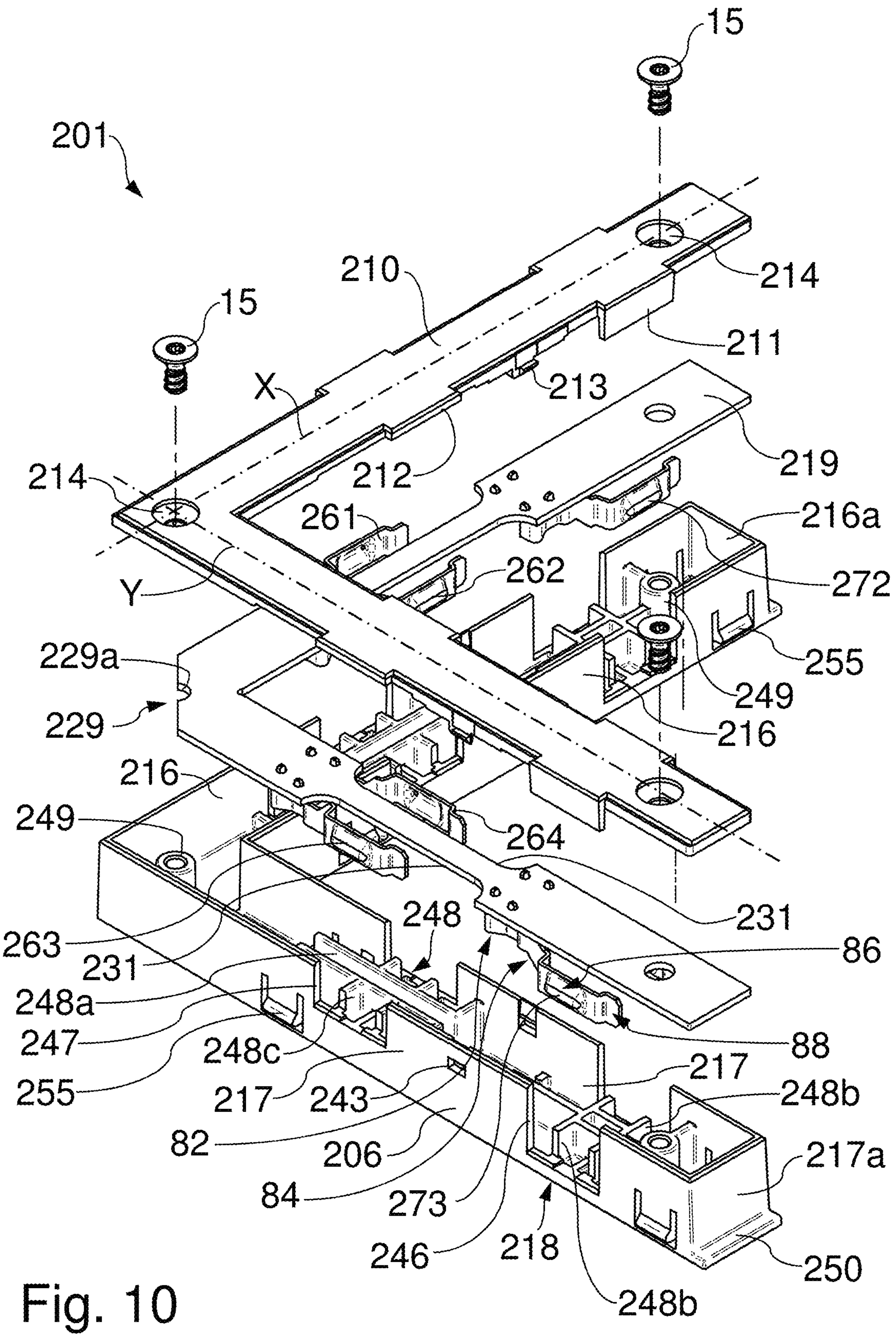
FIG. 10 a connector with an L-like basic shape according to a third exemplary embodiment, in an exploded perspective view, with a box-like housing part, a printed circuit board with contact elements arranged thereon and a cover-like housing part.
Figure 11:
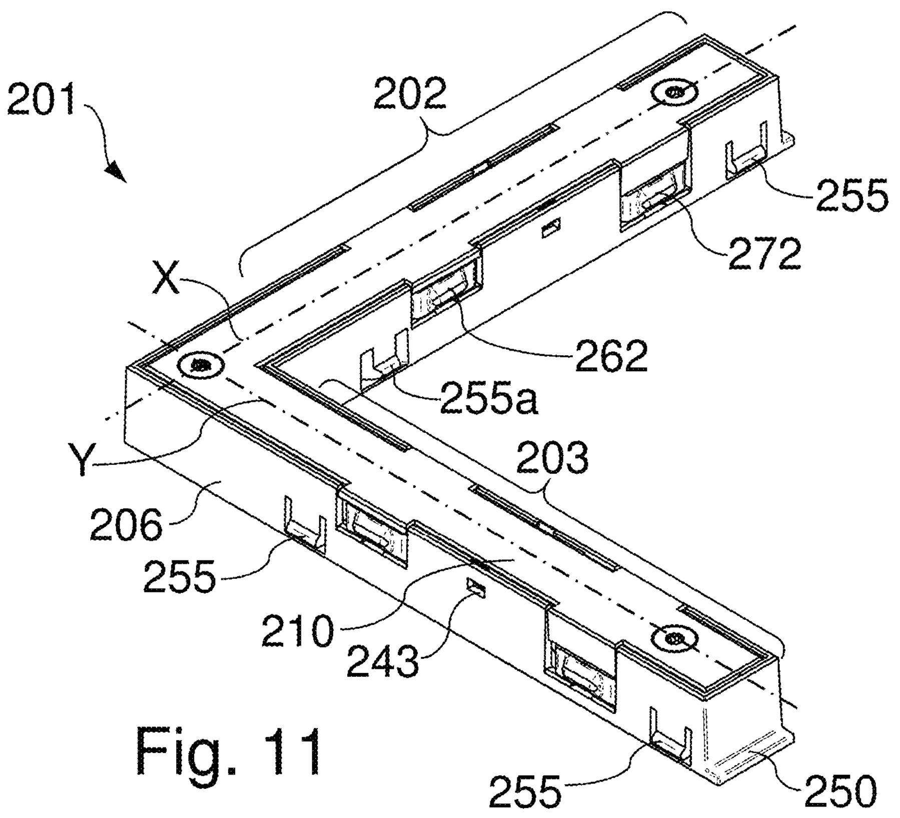
FIG. 11 the connector of FIG. 10, assembled, perspective view.
Figure 12:
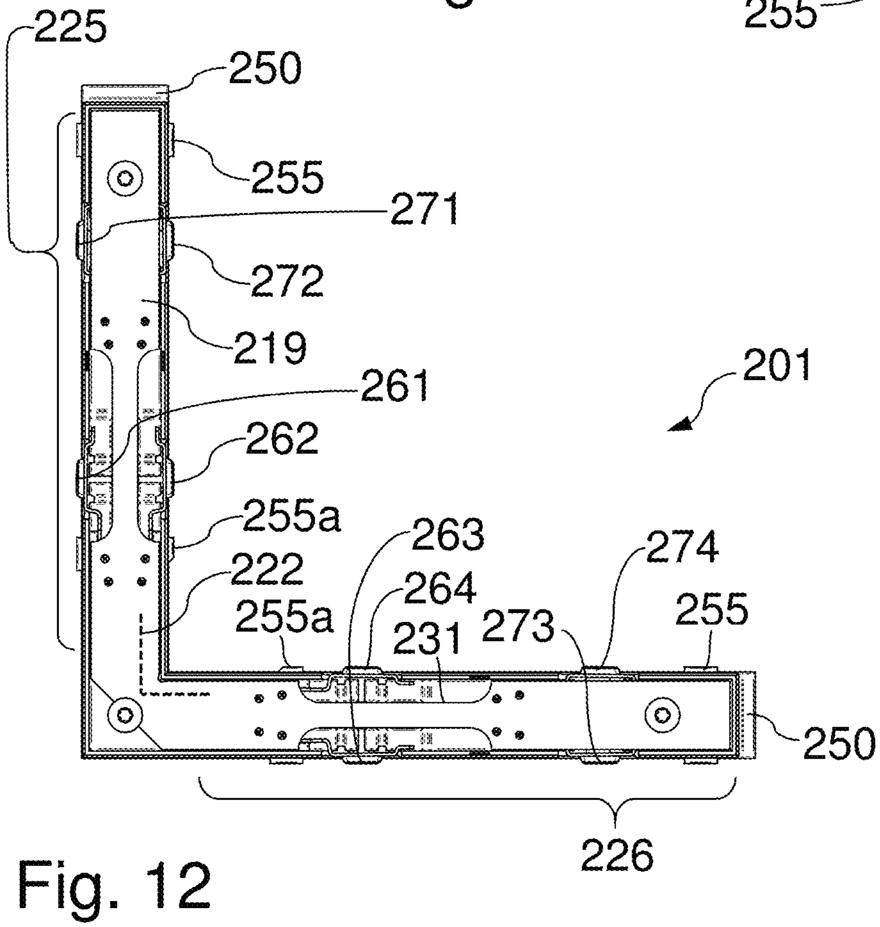
FIG. 12 the connector of FIG. 10 in a plan view, with the cover-like housing part omitted and the printed circuit board visible.

A connector 201 with an L-like basic shape according to a third exemplary embodiment is illustrated in FIGS. 10-12. The connector 201 has elongated cuboid, arm-like connector portions 202 and 203, wherein a longitudinal extension direction X of the connector portion 202 runs approximately perpendicular to a longitudinal extension direction Y of the connector portion 203. However, other angles between the directions X and Y are conceivable as alternatives.

The connector 201 has a box-like housing part 206, a cover-like housing part 210 and a printed circuit board 219 equipped with elastically resilient contact elements 261-264, 271-274 with schematically shown conductive traces 222.

The housing part 206 with an L-shaped basic shape has flat side walls 216 parallel to the longitudinal direction X and flat side walls 217 parallel to the longitudinal direction Y, which are each connected to a base 218 and together with flat end walls 216*a*, 217*a* form a box-like shape.

The side walls 216, 217 each have recesses 246, 247 and latching recesses 243, analogous to the above embodiments. Furthermore, the side walls 216, 217 are each formed with latching means 255, 255*a* for latchingly holding the connector 201 in rail portions into which the connector 201 can be inserted with the connector portions 202, 203. The latching means 255*a*, which can be latched with less force, corresponding to the means 155*a*, are arranged on the inside of the L-like basic shape near a joining region of the connector portions 202, 203. The devices 255 are each designed like the devices 55, 155.

Analogous to the first and second embodiments, the housing part 206 is formed in its inner region with screw domes 249 and a ribbed structure 248 with longitudinal ribs 248*a* and transverse ribs 248*b*, 248*c*. The printed circuit board 219 rests on the longitudinal ribs 248 and the screw domes 249.

The printed circuit board 219 has a substantially L-shaped basic shape, with circuit board portions 225 and 226 forming legs of this basic shape. The printed circuit board 219 is formed and provided with the contact elements 261-264, 271-274 as each of the two printed circuit boards 119 or 120 according to the second exemplary embodiment. The contact elements 261-264, 271-274 are formed and lie on the inside of the housing part 206 as in the second exemplary embodiment. Here, the printed circuit board 219 is provided in each of the two printed circuit board portions 225 and 226 with cutouts 231 arranged symmetrically with respect to the direction X and Y, respectively, for receiving the contact elements 261-264 in a region-wise, elastically movable manner.

Like the printed circuit board 119, 120, the printed circuit board 219 is provided in a peak region 229 of the L-like basic shape with an inclined outer edge region extending at an angle of substantially 45 degrees to each of the X and Y directions. A semicircular recess 229*a* is provided in the center of the sloping outer edge area, which creates space for a screw 15.

Analogous to the first and second embodiments, the cover-like housing part 210 has extensions 211 and 212, latching elements 213 for cooperation with the latching recesses 243, and through openings 214 for screws 15. The housing part 10 also has an L-shaped basic form.

Figure 13:
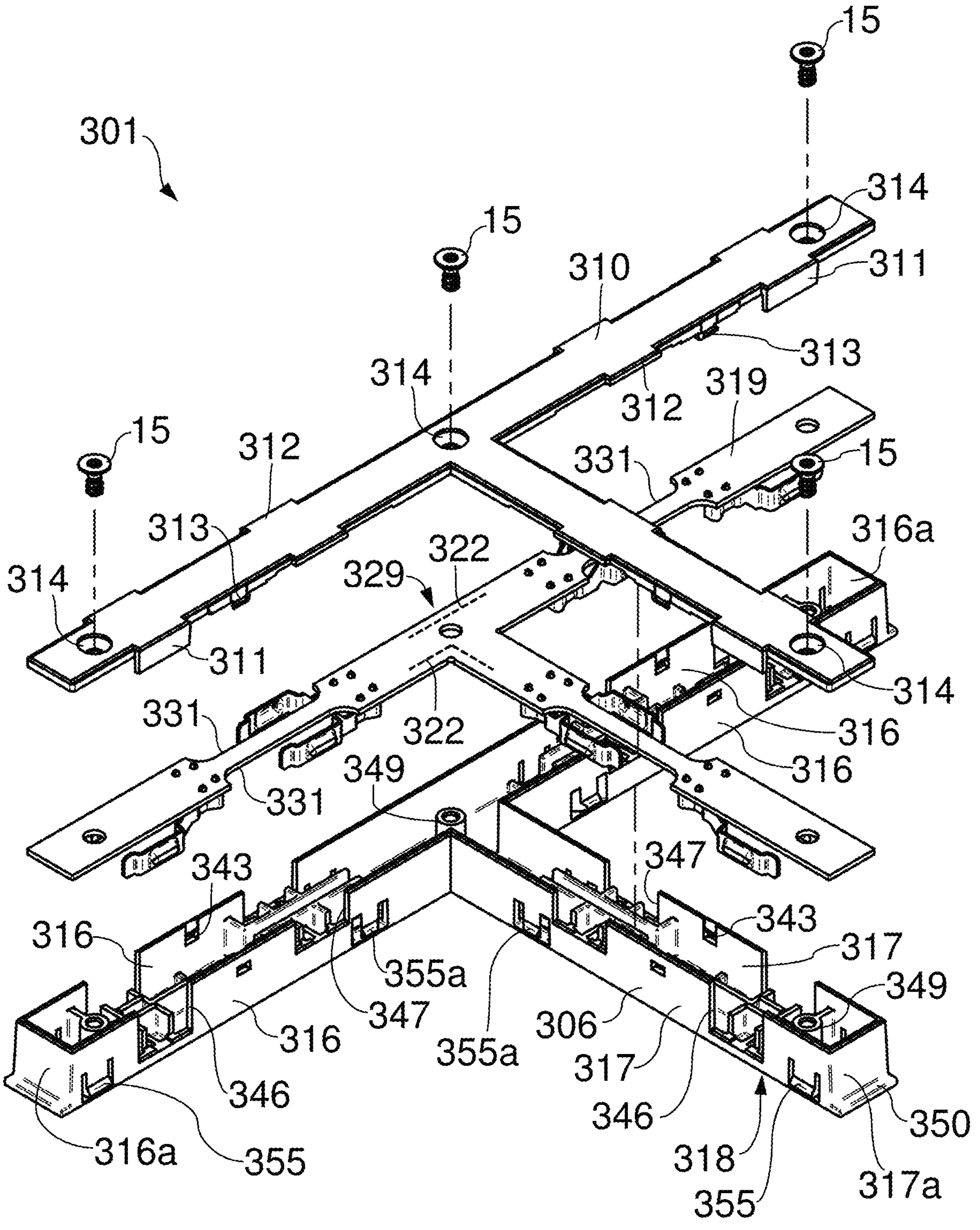
FIG. 13 a connector with a T-like basic shape according to a fourth exemplary embodiment, in an exploded perspective view, with a box-like housing part, a printed circuit board with contact elements arranged thereon and a cover-like housing part.
Figure 14:
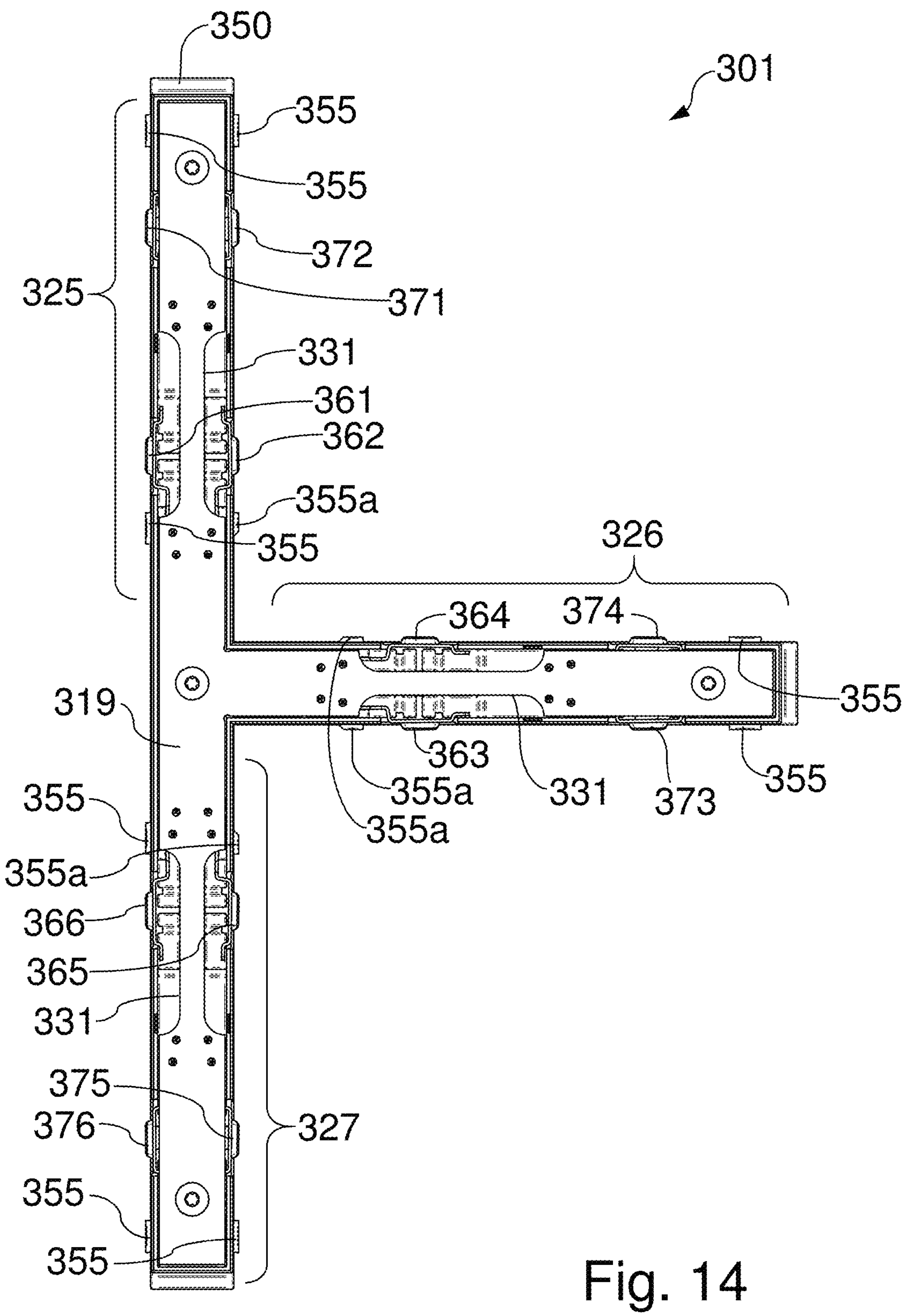
FIG. 14 the connector of FIG. 13 in a plan view, with the cover-like housing part omitted and the printed circuit board visible.
Figure 15:
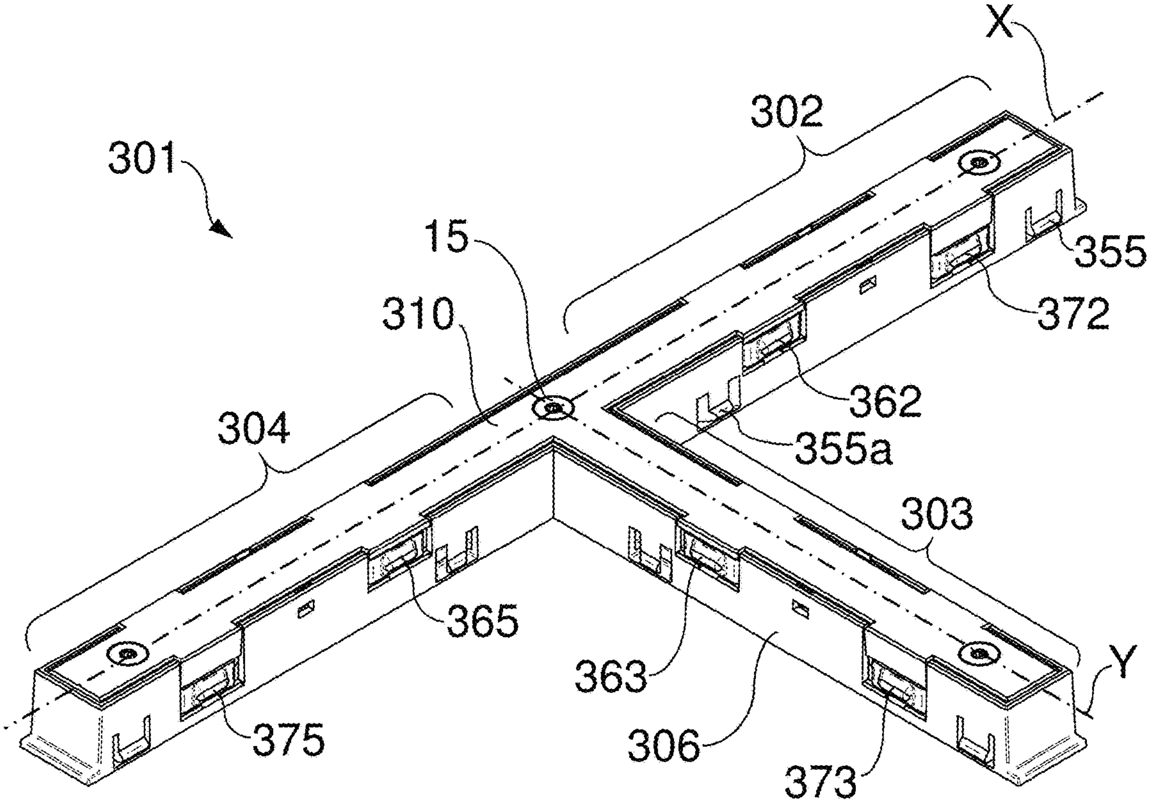
FIG. 15 the connector of FIG. 13, assembled, perspective view.

FIGS. 13-15 show a connector 301 with a T-like basic shape according to a fourth exemplary embodiment with elongated, cuboid connector portions 302, 303 and 304 extending arm-like away from a branching region. The connector portions 302 and 304 extend along a longitudinal extension direction X, while the connector portion 303 extends along a longitudinal extension direction Y that is substantially perpendicular to the direction X.

The connector 301 has a box-like housing part 306, a cover-like housing part 310 and a printed circuit board 319 equipped with elastically resilient contact elements 361-366, 371-376 with schematically shown conductive traces 322. The housing parts 306 and 310 and the printed circuit board 319 have an essentially T-shaped basic form.

The housing part 306 has flat side walls 316 parallel to the direction X and flat side walls 317 parallel to the direction Y, each of which adjoins a flat bottom 318 and, together with flat end walls 316*a*, 317*a*, forms a box-like shape with a T-like base surface. One of the side walls 316 passes through the connector portions 302-304 in the region where they join, while two other side walls 316 are each connected to a side wall 317 in a corner region.

Analogous to the above embodiments, recesses 346, 347, latching recesses 343, latching means 355, 355*a*, screw bosses 349 and a ribbed structure 348 with longitudinal ribs 348*a* and transverse ribs 348*b*, 348*c* are provided, wherein the printed circuit board 319 rests on the screw bosses 349 together with their lateral connecting ribs and on the longitudinal ribs 348. The latching means 355*a*, which can be latched with a lower force, corresponding to the means 155*a* and 255*a*, are arranged on the T-like basic shape on both sides near a joining region of the connector portions 302-304, on that side of the connector 301 on which the connector portion 303 projects at right angles from the aligned connector portions 302, 304.

The printed circuit board 319 has an essentially T-shaped basic form. Circuit board portions 325, 326 and 327 form arms of this basic shape, are each associated with one of the connector portions 302, 303 and 304, respectively, and extend in the associated connector portion 302, 303 and 304, respectively.

The printed circuit board 319 is provided with twelve contact elements 361-366 and 371-376, each of which is firmly connected to the printed circuit board 319 by soldering and is contacted on the printed circuit board 319. Here, the contact elements 361-366 are formed in pairs and arranged on the respectively assigned connector portion 302, 303 or 304 like the contact elements 161-164, 165-168 or 261-264, and the contact elements 371-376 are formed in pairs and arranged on the respectively assigned connector portion 302, 303 or 304 like the contact elements 171-174, 175-178 or 271-274. As in the above embodiments, the contact elements 361-366, 371-376 are each in contact with the bearing portion 88 on the inside of the housing part 306 in the absence of the external force F.

In each of the three printed circuit board portions 325, 326 and 327, the printed circuit board 319 is formed with cutouts 331 arranged symmetrically to its longitudinal direction of extension X or Y for receiving the contact elements 361-366 in certain areas.

Analogous to the first to third embodiments, the cover-like housing part 310 has extensions 311 and 312, latching elements 313 for cooperating with the latching recesses 343, and through openings 314 for screws 15.

In further variants of the embodiments described above, the number of connector portions and/or the angles between them can be further varied.

For example, in a variant of the fourth exemplary embodiment, it may be provided that the connector portions 302 and 304 are not aligned and parallel to each other, but include an angle less than 180 degrees with each other. In this way, for example, a connector with a Y-shaped base can be formed.

Furthermore, in a variant of the second embodiment, for example, it is possible to provide more than four connector portions which, for example, are arranged evenly around a center, extend from it in an arm-like manner and form angles of less than 90 degrees with each other in pairs. In this way, a star-like basic shape of the connector can be formed, whereby the connector then has, for example, a printed circuit board with a corresponding star-like basic shape. In another variant, it would be conceivable to arrange the more than four connector portions unevenly around the center with different angles between adjacent connector portions.

Figure 16:
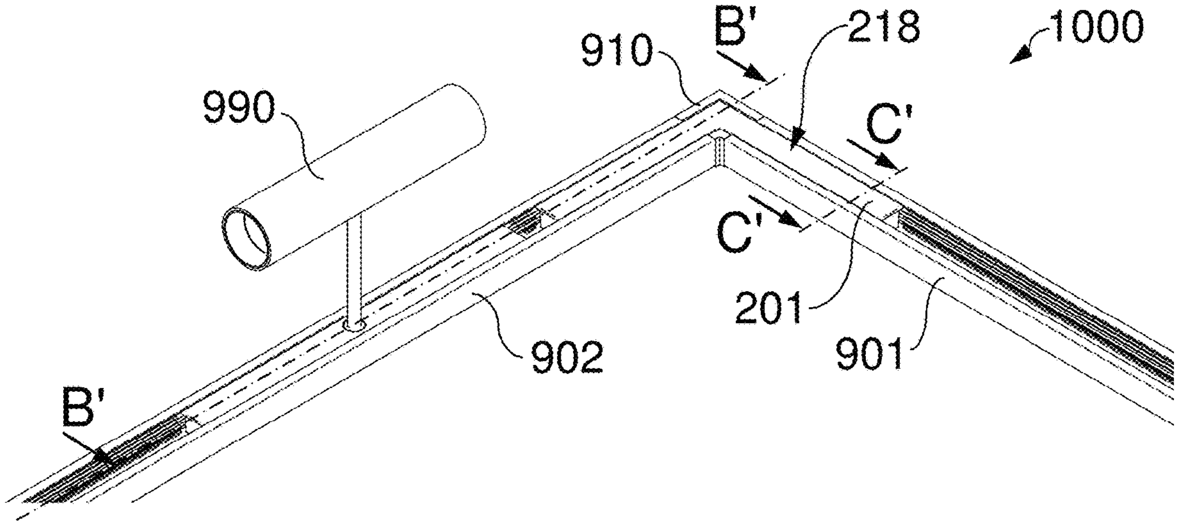
FIG. 16 a portion of a lighting arrangement according to a further exemplary embodiment, in a perspective bottom view, comprising a connector according to the third exemplary embodiment.

A lighting arrangement 1000 according to an exemplary embodiment is shown in perspective and in sections in FIG. 16 from a side which corresponds to an underside thereof in the mounted state. The lighting arrangement 1000 comprises rail portions 901 and 902, which are profiled and of the same type. The rail portions 901 and 902 each have a conductor arrangement 950, see in particular the cross-sectional representation in FIG. 20, for supplying lighting devices 990, which can be coupled to the rail portions 901, 902, with electrical operating current and a control signal, in particular a DALI signal. A lighting device 990 mechanically and electrically coupled to the rail portion 902 is shown by way of example in FIG. 16 as a spotlight, it being understood that lighting devices of other types can be supplied by means of the rail portions 901, 902. The rail portions 901, 902 are intended, for example, to be mounted on a ceiling of a room and thus together form a ceiling mounting rail. Alternatively, rail portions 901, 902 that can be built into such a ceiling or suspended from such a ceiling, for example, are also conceivable.

The rail portions 901, 902 are connected to each other by means of an intermediate L-piece 910 such that the rail portions 901, 902 and the intermediate L-piece 910 form a substantially right-angled corner. The L intermediate piece 910 is designed as a purely mechanical connecting piece without an electrical function.

The lighting arrangement 1000 further comprises a connector 201 according to the third exemplary embodiment, the connector portion 203 of which is inserted into the rail portion 901 and the connector portion 202 of which is inserted into the rail portion 901. A peak region of the connector 201, in which the connector portions 202, 203 are connected, is accommodated in the L-shaped intermediate piece 910, the inner contour of which may substantially correspond in geometric terms to that of the rail portions 901, 902.

The rail portions 901, 902 have an exemplary channel-like design. The conductor arrangement 950 of each rail portion 901, 902 has laterally on both sides in an interior of the rail portion 901, 902 a holding body made of an insulating material and conductors 951-954 which are held in the holding body and can be contacted from the interior and which extend along a longitudinal direction of the rail portion 901, 902.

The conductors 951 and 953 serve to provide a DC operating voltage for the lighting devices 990, in particular a DC operating voltage of essentially 48 volts. Conductors 952 and 954 are used to provide a control signal, in particular a DALI signal, to control the lighting devices 990.

The connector 201 electrically couples the conductor arrangements 950 of the rail portions 901 and 902 to one another. For this purpose, the contact elements 263, 264 contact the conductors 951 or 953 and the contact elements 273, 274 contact the conductors 952 or 954 of the rail portion 901. Furthermore, the contact elements 261, 262 contact the corresponding conductors 951 and 953, respectively, and the contact elements 271, 272 contact the corresponding conductors 952 and 954, respectively, of the rail portion 902.

Using the conductive traces 222 of the connector 201, the contact elements 261 and 263, 262 and 264, 271 and 273 and 272 and 274 are each electrically coupled to one another in such a way that the operating voltage can be transmitted from one of the rail portions 901, 902 to the other with the aid of the contact elements 261-264 and the control signal with the aid of the contact elements 271-274.

Preferably, with the connector 201, and also with the other connectors 1, 101, 301, operating current and control signal are forwarded via conductive traces 22, 122, 123, 222, 322 of the continuous printed circuit boards 19, 119 or 120, 219, 319, without, for example, further processing of the control signal or switching of operating current on the printed circuit board 19, 119, 120, 219, 319. Electronic components extending beyond the conductive traces 22, 122, 123, 222, 322 are thus not required and preferably not provided on the printed circuit board 19, 119, 120, 219, 319. However, in variants it would be conceivable to provide one or more electronic components, for example for processing or interpreting the control signal and for selectively forwarding or not forwarding the operating current on the printed circuit board 119, 119, 120, 219, 319.

Figure 20:
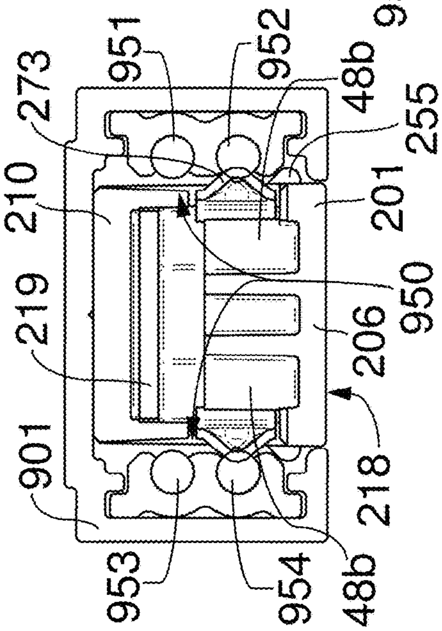
FIG. 20 a sectional view C'-C' of the lighting arrangement of FIG. 16.
Figure 19:
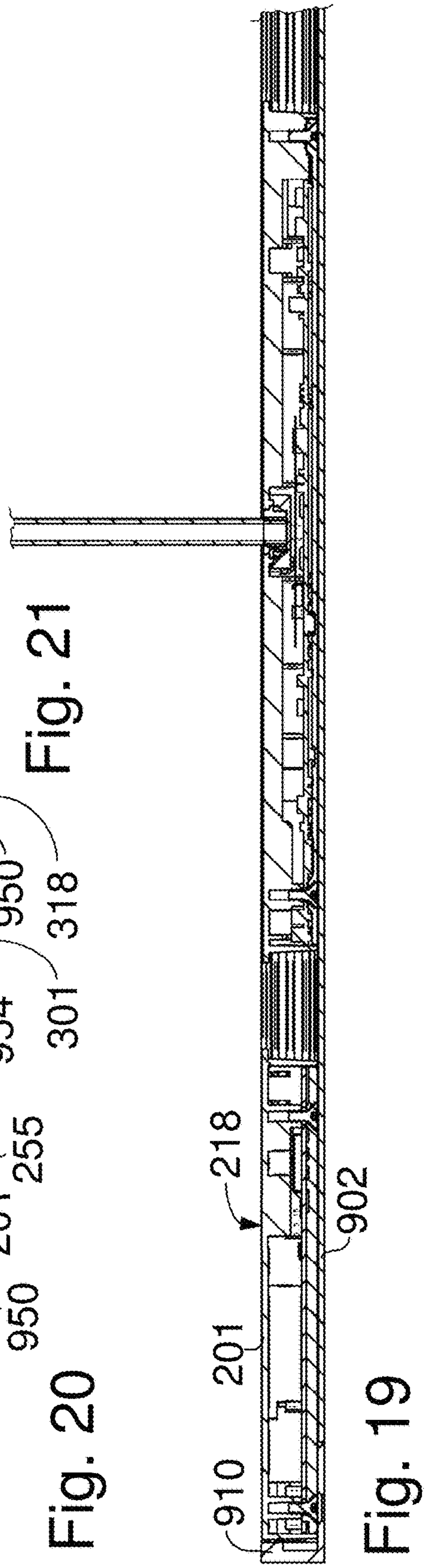
FIG. 19 a sectional view B'-B' of the lighting arrangement of FIG. 16.

When the connector 201 is inserted into the rail portions 901, 902, the latching means 255, 255*a* engage behind inner edges in the area of an open side of the rail portions 901, 902, see FIG. 20. The contact elements 261-264, 271-274 each spring into the housing part 206 in the direction Q when the connector 201 is inserted and apply a sufficient and suitable spring force for contacting. The connector 201 can be removed in a simple manner by gripping behind grip strips 250, which are formed at the free ends of the connector portions 202, 203 on the housing part 206, and applying a force to release the latching means 255, 255*a*. Corresponding grip strips 50, 150, 350 are also provided on the housing parts 6, 106, 306 of the connectors 1, 101, 301.

Figure 17:
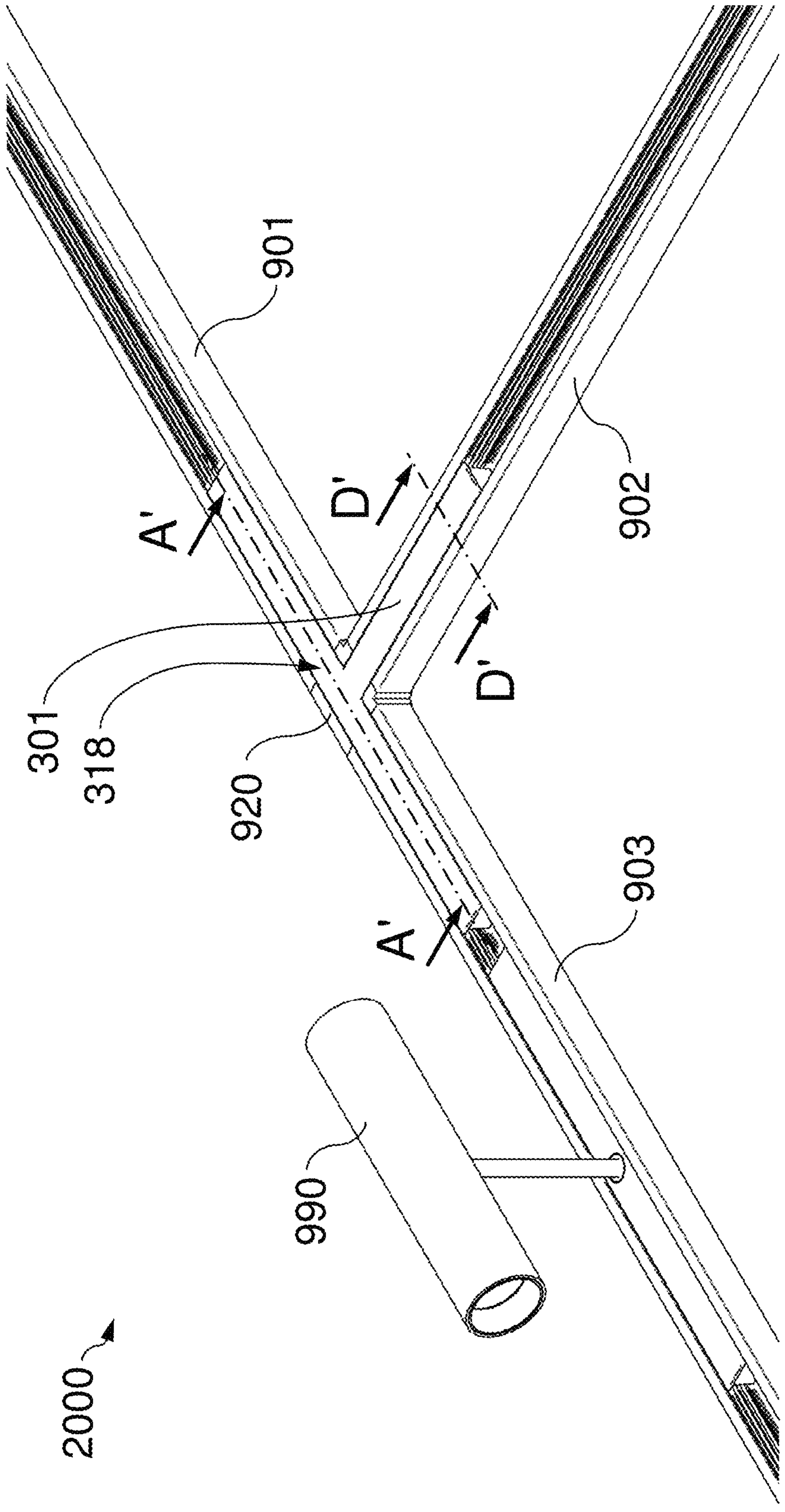
FIG. 17 a portion of a lighting arrangement according to a still further exemplary embodiment, in a perspective bottom view, comprising a connector according to the fourth exemplary embodiment.

A lighting arrangement 2000 according to a further exemplary embodiment is shown in FIG. 17 in perspective from an underside, analogous to the illustration in FIG. 16.

The lighting arrangement 2000 has three similar rail portions 901, 902, 903, which are mechanically coupled together in the manner of a T with an intermediate T-piece 920. Like the L-connector 910, the T-connector 920 is also a purely mechanical connector with no electrical function. The electrical coupling of the conductor arrangements 950 of all the rail portions 901-903 with each other, by coupling the corresponding conductors 951-954, is carried out by means of the connector 301, which is inserted into the rail portions 903, 902 and 901 with the connector portions 302-304. The contact elements 361, 363 and 366, the contact elements 362, 364, 365, the contact elements 371, 373, 376, and the contact elements 372, 374, 375 are each electrically coupled to one another via the conductive traces 322.

Further lighting arrangements can be formed in which two coaxially arranged rail portions 901, 902 are coupled together by means of the connector 1. In this case, a straight intermediate piece may be provided between the rail portions 901, 902 for mechanical coupling. In the connector 1, the contact elements 61 and 63, the contact elements 62 and 64, the contact elements 71 and 73 and the contact elements 72 and 74 are each electrically coupled to one another via the conductive traces 22.

In terms of its electrical function, the X-shaped connector 101 corresponds to two L-shaped connectors 201 joined together in the peak region, whereby neither control signals nor electrical operating current are transmitted across the diagonal disconnection point T. The markings 198, 199 are used to show a fitter which connected rail portions are electrically coupled.

In the exemplary embodiments explained above in FIGS. 1-21, the connector portions 2, 3, 102-105, 202, 203 and 302-304 are each formed in a straight line along their longitudinal extension direction X and Y respectively. For interaction with rail portions that are not straight like the rail portions 901-903 but curved, one or more of the connector portions 2, 3, 102-105, 202, 203 and 302-304 can be curved or bent along the longitudinal extent of the connector portion 2, 3, 102-105, 202, 203 or 302-304. In the case of a bent or curved connector portion 2, 3, 102-105, 202, 203 or 302-304, the shape of the associated printed circuit board portion 25, 26, 125-128, 225, 226 or 325-327 follows the bend or curvature of the connector portion 2, 3, 102-105, 202, 203 or 302-304. The side walls 16, 116, 117, 216, 217, 316 or 317 then deviate from a flat shape in the curved or bent version.

FIG. 22 shows a feed-in component 401 according to a still further embodiment of the invention. The feed-in component 401 has a box-like housing part 406 and a cover-like housing part 410, which are formed analogously to the first exemplary embodiment, but shorter than the housing parts 6, 10. For example, the housing part 410 also has extensions 411, 412 which close recesses in side walls 416 of the housing part 406.

A printed circuit board, not shown in detail in FIG. 22, is arranged inside the housing part 406. Contact elements 461, 462, 471, 472 are arranged on the printed circuit board and are firmly connected to the printed circuit board by means of soldering and are contacted on the printed circuit board. The contact elements 461, 462, 471, 472 are designed and arranged like the contact elements 61, 62, 71, 72 of the first exemplary embodiment and, in the absence of the external force F, bear in the manner described above for the connector 1 in regions on the inside of the housing part 406, in each case in an edge region of the recess. The printed circuit board of the feed-in component 401 can thus correspond approximately to the left half of the printed circuit board 19 in FIG. 1. In addition, the side walls 416 have latching means 455 for holding the feed-in component 401 in a rail portion, for example one of the rail portions 901-903.

The feed-in component 401 has a feed line 495 which, by way of example, enters the housing part 406 at an end wall 416*a*.

The feed-in component 401 can, for example, be inserted into the rail portion 901 or 902 of the lighting arrangement 1000, or into the rail portion 901 or 902 or 903 of the lighting arrangement 2000, in order to feed the conductor arrangement 950 of the rail portion into which the feed-in component 401 is inserted with the electrical operating current, for example at 48V DC voltage, and the control signal, for example the DALI signal.

Using conductive traces of the printed circuit board of the feed-in component 401, the contact elements 461, 462 are electrically coupled to corresponding conductors of the feed line 495 for the electrical operating current, and the contact elements 471, 472 are electrically coupled to corresponding conductors of the feed line 495 for the control signal.

Along a longitudinal direction of the rail portion, thus for example along a longitudinal direction of the rail portion 901, 902 or 903, the feed-in component 401 can be freely positioned and thus inserted into the rail portion at any free position. In addition, the feed-in component 401 inserted into the rail portion, such as 901, 902 or 903, can be moved along the rail portion.

While in FIG. 22 the feed-in component 401 is designed to extend essentially in a straight or linear manner, in variants the feed-in component 401 can be designed to be curved, analogous to the above-mentioned variant of the connector portion 2, for example.

Although the present invention has been fully described above with reference to the preferred exemplary embodiments, it is not limited to these exemplary embodiments and can be modified in a variety of other ways.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding Austrian application No. A50971/2023, filed Dec. 4, 2023, are incorporated by reference herein.

LIST OF REFERENCE SIGNS

1 connector
2,3 connector portion
6 box-like housing part
10 cover-like housing part
11, 12 extension
13 latching element
14 through hole
15 screw
16 side wall
16*a* wall
18 bottom
19 printed circuit board
22 conductive trace
25, 26 printed circuit board portion
31, 32 cutout
43 latching recess
46, 47 recess
48 ribbed structure
48*a* longitudinal ribs
48*b*, 48*c* transverse ribs
49 screw dome
50 grip strip
55 latching means
61, 62, 63, 64 contact element
71, 72, 73, 74 contact element
82 fastening portion
84 resilient intermediate portion
86 contact portion
88 bearing portion
101 connector
102, 103, 104, 105 connector portion
106 box-like housing part
110 cover-like housing part
111, 112 extension
113 latching element
114 through hole
116, 117 side wall
116*a*, 117*a* wall
118 bottom
119 printed circuit board
120 printed circuit board
122, 123 conductive trace
125, 126, 127, 128 printed circuit board portion
129 peak region
129*a* recess
131 cutout
143 latching recess
146, 147 recess
148 ribbed structure
148*a* longitudinal ribs
148*b*, 148*c* transverse ribs
149 screw dome
150 grip strip
155, 155*a* latching means
161, 162, 163, 164 contact element
165, 166, 167, 168 contact element
171, 172, 173, 174 contact element
175, 176, 177, 178 contact element
198, 199 marking
201 connector
202, 203 connector portion
206 box-like housing part
210 cover-like housing part
211, 212 extension
213 latching element
214 through hole
216, 217 side wall
216*a*, 217*a* wall
218 bottom
219 printed circuit board
222 conductive trace
225, 226 printed circuit board portion
229 peak region
229*a* recess
231 cutout
243 latching recess
246, 247 recess
248 ribbed structure
248*a* longitudinal ribs
248*b*, 248*c* transverse ribs
249 screw dome
250 grip strip
255, 255*a* latching means
261, 262, 263, 264 contact element
271, 272, 273, 274 contact element
301 connector
302, 303, 304 connector portion
306 box-like housing part
310 cover-like housing part
316, 317 side wall
316*a*, 317*a* wall
318 bottom
319 printed circuit board
322 conductive trace
325, 326, 327 printed circuit board portion
329 peak region
331 cutout
343 latching recess
346, 347 recess
348*a* longitudinal ribs
348*b*, 348*c* transverse ribs
349 screw dome
350 grip strip
355, 355*a* latching means
361, 362, 363 contact element
364, 365, 366 contact element
371, 372, 373 contact element
374, 375, 376 contact element
401 feed-in component
406 box-like housing part
410 cover-like housing part
411, 412 extension
416 side wall
416*a* wall
455 latching means
461, 462, 471, 472 contact element
495 feed line
901, 902, 903 rail portion
910 L-intermediate piece
920 T-intermediate piece
950 conductor arrangement
951, 952, 953, 954 conductor
990 lighting device
1000, 2000 lighting arrangement
F external force
Q transverse direction
T separation point
X, Y direction

What is claimed:

1. A connector, which, in each case, with a connector portion of the same, can be inserted into rail portions of a lighting system;

wherein the rail portions are each provided with a conductor arrangement for supplying to lighting devices, capable of being coupled to the rail portions, at least an electrical operating current;

wherein the connector is configured to electrically couple the conductor arrangements of at least two of the rail portions to one another;

wherein the connector comprises a printed circuit board having conductive traces, and the connector comprises contact elements, which are each firmly connected to the printed circuit board and are configured in each case to contact a respective conductor of one of the conductor arrangements of the at least two rail portions;

wherein the connector enables an electrical coupling of corresponding ones of the conductors of the conductor arrangements of the at least two rail portions by means of an electrical coupling of associated ones of the contact elements using at least one of the conductive traces;

wherein the connector comprises a housing part, wherein the contact elements, in the absence of an external force acting on the contact element, in each case abut against a region of the housing part in a resiliently prestressed manner; and wherein the housing part comprises side walls which are each provided with recesses, wherein the contact elements and the recesses are arranged and configured in such a way that a contact portion of one of the contact elements provided for contacting a conductor projects outwards through the recesses in each case.

2. Connector according to claim 1, wherein the contact elements are configured to be elastically resilient.

3. Connector according to claim 1, wherein the printed circuit board is accommodated in an inner region of the housing part.

4. Connector according to claim 1, wherein the contact elements are each configured to have a bearing portion which, in the absence of the external force acting on the contact element, abuts against the housing part on the inside in a resiliently prestressed manner.

5. Connector according to claim 1, wherein, in the edge region of the recess assigned to the contact element, in the absence of the external force acting on the contact element, the contact elements abut against the side wall on the inside in a resiliently prestressed manner.

6. Connector according to claim 1, wherein the side walls adjoin a base of the housing part, wherein the printed circuit board is substantially parallel to the base; and wherein the side walls together with the base and with further walls of the housing part form a box-like shape.

7. Connector according to claim 1, wherein the side walls are also configured with latching means for holding the connector in the rail portions in a latching manner.

8. Connector according to claim 1, wherein the connector is configured to have an I-like basic shape, wherein the connector portions are configured as free, mutually aligned end regions of the connector; or wherein the connector is formed to have an X-like basic shape or an L-like basic shape or a T-like basic shape, wherein the connector portions are configured as arm-like extending regions of the connector.

9. Connector according to claim 1, wherein the connector is configured to have an X-like basic shape, the connector portions being configured as arm-like extending regions of the connector, and wherein the connector comprises two printed circuit boards each having a substantially L-like basic shape, a number of the contact elements each being arranged on one of the two printed circuit boards, two of the connector portions each being assigned to one of the two printed circuit boards, and the two printed circuit boards being arranged in such a way that peak regions each of the substantially L-shaped basic shape of the same are adjacent to one another.

10. Connector according to claim 1, wherein the contact elements of the connector comprise contact elements, each being configured to contact conductors to provide a DC operating voltage for the lighting devices.

11. Connector according to claim 1, wherein the conductor arrangement, with which the rail portions are each provided, is furthermore configured to provide a control signal for controlling one or more of the lighting devices capable of being coupled to the rail portions.

12. Connector according to claim 11, wherein the contact elements of the connector comprise contact elements each of which is configured to contact conductors for providing the control signal.

13. Connector according to claim 1, wherein the contact elements are each soldered to the printed circuit board.

14. Connector according to claim 1, wherein the contact elements are each configured with a fastening portion for the fixed connection to the printed circuit board and a cranked, resilient intermediate portion following the fastening portion.

15. Connector according to claim 1, wherein the printed circuit board is configured with elongated printed circuit board portions, each of which being assigned to one of the connector portions and extending in the respectively assigned connector portion, and furthermore wherein the printed circuit board portion has a cutout at one edge thereof in each case for receiving an associated one of the contact elements in certain regions.

16. Connector according to claim 1, wherein a direction along which the contact elements can spring back when the connector is inserted into the rail portions is substantially transverse to a longitudinal extension direction of the connector portion, in which the contact element is arranged, and substantially parallel to a main extension surface of the printed circuit board.

17. Lighting arrangement comprising at least two rail portions, at least one connector according to claim 1, and at least one lighting device, wherein the rail portions are each provided with a conductor arrangement and the lighting device is coupled to one of the rail portions and can be supplied with at least electrical operating current by its conductor arrangement; and wherein the connector with a connector portion thereof in each case is inserted into the rail portions and electrically couples the conductor arrangements of the rail portions to one another.

18. A feed-in component, which can be inserted into at least one rail portion of a lighting system;

wherein the rail portion is provided with a conductor arrangement for supplying at least electrical operating current to lighting devices capable of being coupled to the rail portion;

wherein the feed-in component is configured to feed the conductor arrangement of the rail portion at least with the electrical operating current;

wherein the feed-in component comprises a printed circuit board having conductive traces and the feed-in component comprises contact elements each of which being fixedly connected to the printed circuit board and configured to contact a conductor of the conductor arrangement of the rail portion in each case;

wherein the feed-in component enables conductors of the conductor arrangement of the rail portion to be electrically coupled to the corresponding conductors of a feed line using at least one of the conductive traces;

wherein the feed-in component comprises a housing part, wherein the contact elements, in the absence of an external force acting on the contact element, in each case abut against a region of the housing part in a resiliently prestressed manner; and wherein the housing part comprises side walls which are each provided with recesses, wherein the contact elements and the recesses are arranged and configured in such a way that a contact portion of one of the contact elements provided for contacting a conductor projects outwards through the recesses in each case.

19. Lighting arrangement comprising at least one rail portion, at least one feed-in component according to claim 18, and at least one lighting device, wherein the rail portion is provided with a conductor arrangement and the lighting device is coupled to the rail portion and can be supplied with at least electrical operating current by the conductor arrangement thereof; and wherein the feed-in component is inserted into the rail portion and feeds the conductor arrangement of the rail portion with at least the electrical operating current.

20. A connector, which, in each case, with a connector portion of the same, can be inserted into rail portions of a lighting system;

wherein the rail portions are each provided with a conductor arrangement for supplying to lighting devices, capable of being coupled to the rail portions, at least an electrical operating current;

wherein the connector is configured to electrically couple the conductor arrangements of at least two of the rail portions to one another;

wherein the connector comprises a printed circuit board having conductive traces, and the connector comprises contact elements, which are each firmly connected to the printed circuit board and are configured in each case to contact a respective conductor of one of the conductor arrangements of the at least two rail portions;

wherein the connector enables an electrical coupling of corresponding ones of the conductors of the conductor arrangements of the at least two rail portions by means of an electrical coupling of associated ones of the contact elements using at least one of the conductive traces; and wherein a direction along which the contact elements can spring back when the connector is inserted into the rail portions is substantially transverse to a longitudinal extension direction of the connector portion, in which the contact element is arranged, and substantially parallel to a main extension surface of the printed circuit board.

* * * * *